United States Patent [19]

Matsuoka et al.

[11] Patent Number: 5,249,484
[45] Date of Patent: Oct. 5, 1993

[54] APPARATUS FOR CONTROLLING SHIFTING OF VEHICLE AUTOMATIC TRANSMISSION BASED ON ENGINE INTAKE AIR QUANTITY

[75] Inventors: Hiroki Matsuoka, Susono; Norihisa Nakagawa, Numazu, both of Japan

[73] Assignee: Toyota Jidosha Kabushiki Kaisha, Toyota, Japan

[21] Appl. No.: 890,704

[22] Filed: May 29, 1992

[30] Foreign Application Priority Data

Jun. 3, 1991 [JP] Japan .................. 3-131284

[51] Int. Cl.$^5$ ........................................... F16H 61/02
[52] U.S. Cl. .................................................. 74/866
[58] Field of Search ............ 74/866; 364/424.1, 431.07

[56] References Cited

U.S. PATENT DOCUMENTS

| | | | |
|---|---|---|---|
| 4,622,637 | 11/1986 | Tomita et al. | 364/424.1 |
| 4,637,280 | 1/1987 | Oshiage | 74/866 |
| 4,838,125 | 6/1989 | Hamano et al. | 74/866 |
| 4,970,916 | 11/1990 | Narita | 74/866 |
| 5,003,950 | 4/1991 | Kato et al. | 123/422 |

FOREIGN PATENT DOCUMENTS

| | | |
|---|---|---|
| 18-30329 | 12/1943 | Japan . |
| 60-34563 | 2/1985 | Japan . |
| 60-263754 | 12/1985 | Japan . |
| 61-45160 | 3/1986 | Japan . |
| 62-184934 | 8/1987 | Japan . |
| 1-218932 | 9/1989 | Japan . |
| 2-266155 | 10/1990 | Japan . |

Primary Examiner—Dirk Wright
Attorney, Agent, or Firm—Oblon, Spivak, McClelland, Maier & Neustadt

[57] ABSTRACT

A shift control apparatus for an automatic transmission of a motor vehicle, including a sensor for detecting a throttle valve opening which regulates an intake air quantity supplied to the vehicle engine, an engine speed sensor for detecting the engine speed, a vehicle speed sensor for detecting the vehicle running speed, a calculating device for calculating the intake air quantity for a steady running of the vehicle, based on the detected throttle valve opening and engine speed, a processing device for processing the calculated intake air quantity to compensate the calculated intake air quantity for a first-order time lag and obtain an estimated intake air quantity, and an automatic shift control device for automatically selecting an optimum operating position of the automatic transmission, based on the estimated intake air quantity and the detected vehicle running speed, according to a predetermined shift control pattern.

17 Claims, 15 Drawing Sheets

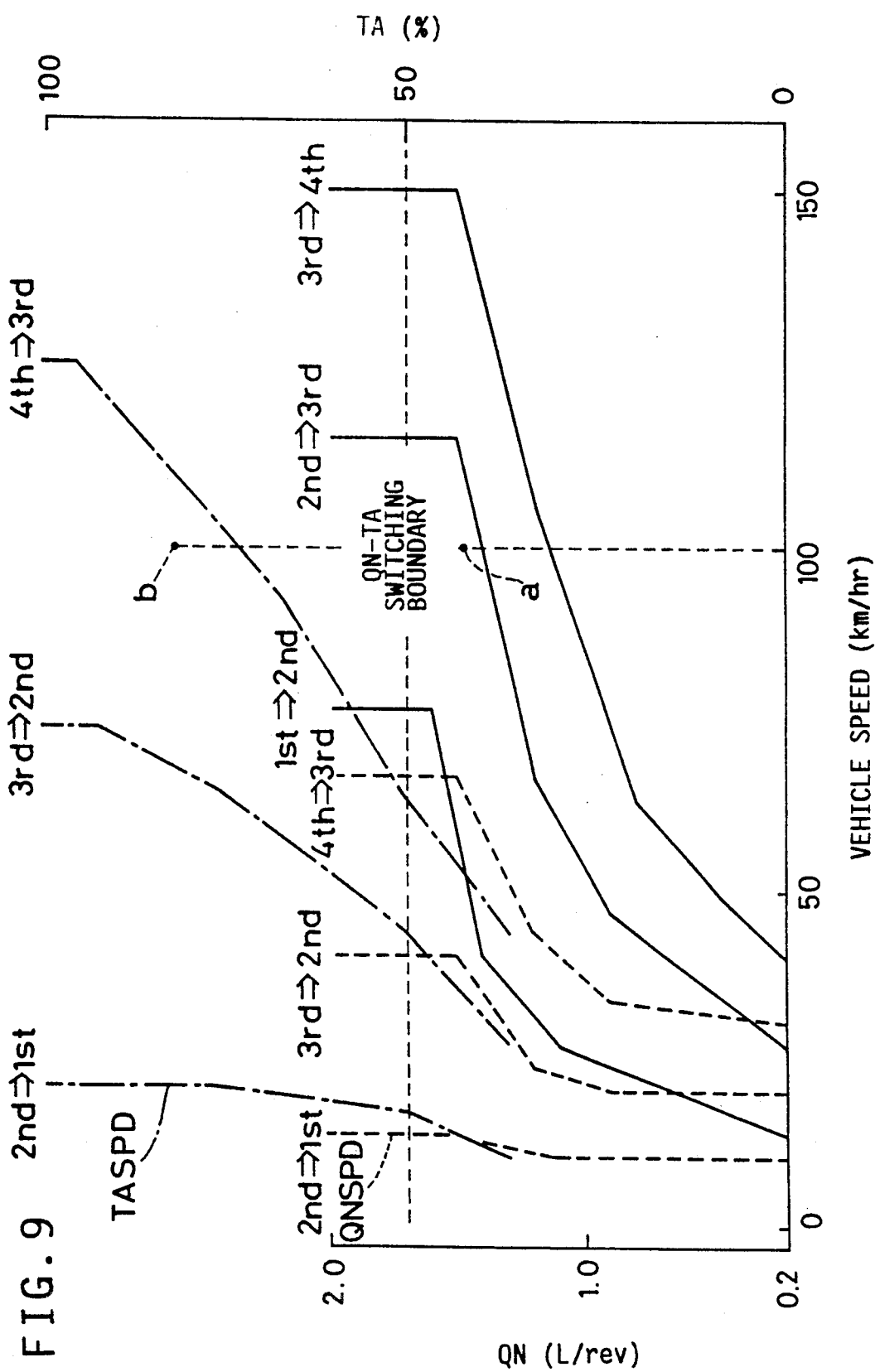

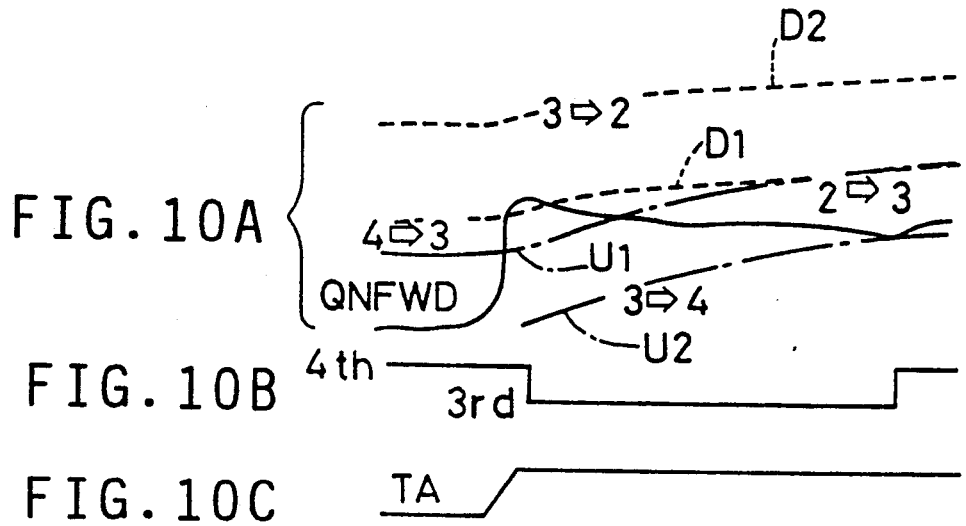
FIG. 10A
FIG. 10B
FIG. 10C
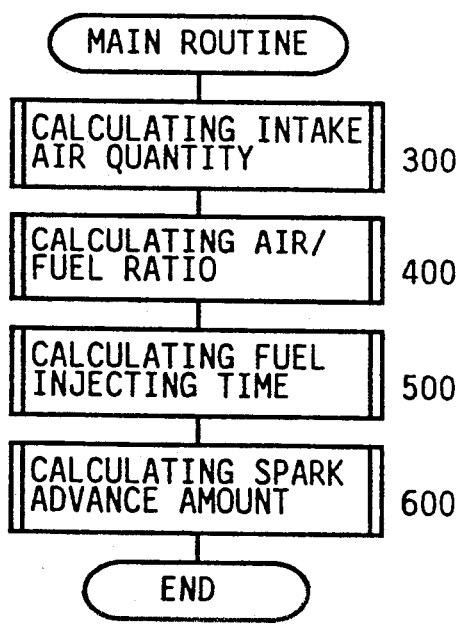
FIG. 11
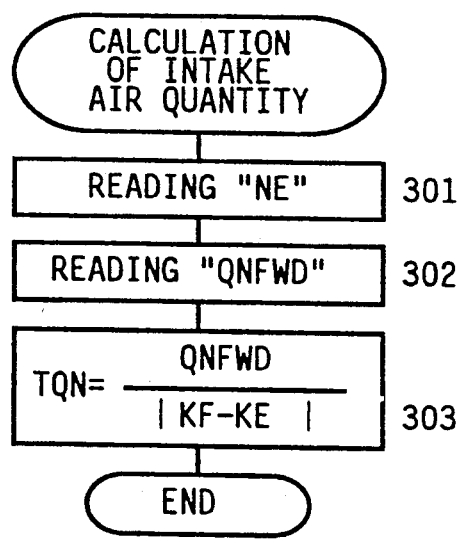
FIG. 12

FIG. 20
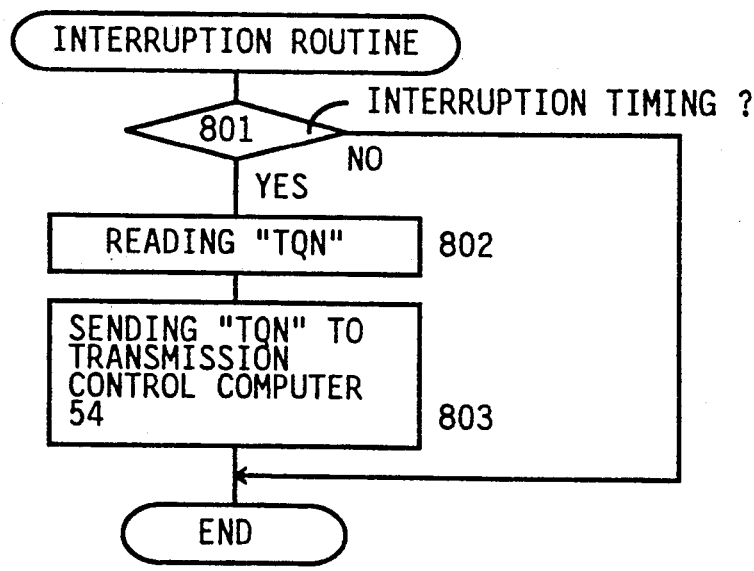
FIG. 21A PRIOR ART
FIG. 21B PRIOR ART
FIG. 21C PRIOR ART
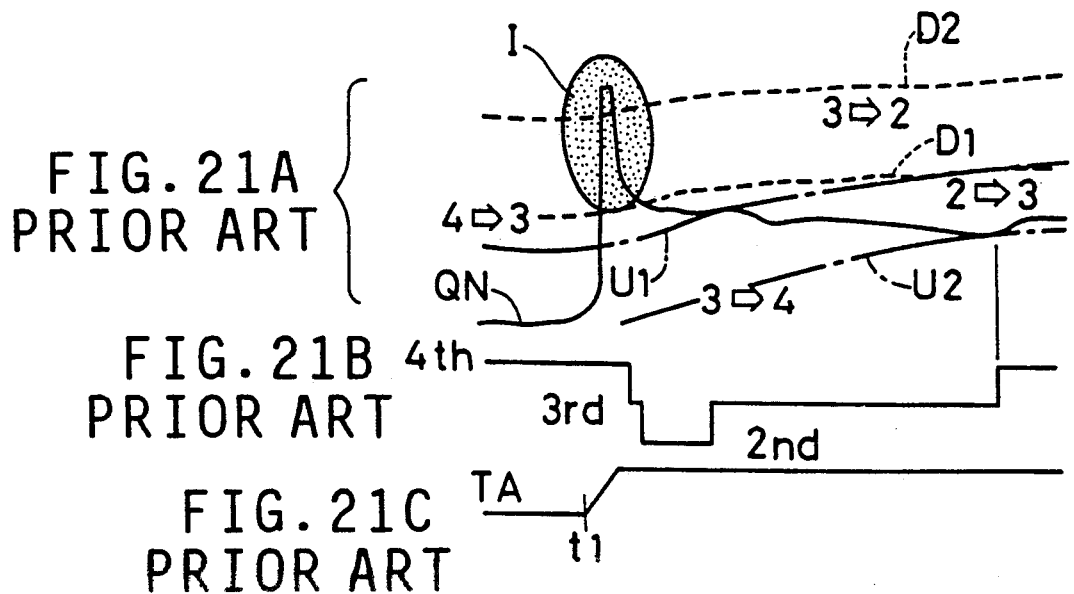

APPARATUS FOR CONTROLLING SHIFTING OF VEHICLE AUTOMATIC TRANSMISSION BASED ON ENGINE INTAKE AIR QUANTITY

BACKGROUND OF THE INVENTION

1. Field of the Invention

The present invention relates generally to an apparatus for controlling an automatic transmission of a motor vehicle, and more particularly to such an automatic transmission shift control apparatus for selecting an operating position of the automatic transmission, according to a shift control pattern, based on a value corresponding to a ratio of an engine intake air quantity to an engine speed.

2. Discussion of the Prior Art

There is known an electronic automatic transmission shift control apparatus for automatically controlling an automatic transmission of a motor vehicle, as disclosed in laid-open Publication No. 60-34563 of unexamined Japanese Patent Application. This shift control apparatus uses an intake air sensor for calculating an intake air quantity Q of an internal combustion engine of the vehicle. A value Q/N obtained by dividing the intake air quantity Q by a speed N of the engine, corresponds to a torque of the engine. The value Q/N will be referred to simply as "intake air quantity QN". The shift control apparatus is adapted such that the automatic transmission is automatically shifted up and down according to a shift control pattern representative of a relationship between the value Q/N (intake air quantity QN) and the running speed of the vehicle.

In this known automatic transmission shift control apparatus, the shift control pattern consists of shift-up boundary lines for shifting up the transmission, and shift-down boundary lines for shifting down the transmission. The shift control apparatus commands the transmission to be shifted up to a next high-gear position when the intake air quantity QN decreases below the level of an appropriate shift-up boundary line, and shifted down to a next low-gear position when the intake air quantity QN increases above the level of an appropriate shift-down boundary line. Thus, the shifting operation of the transmission is automatically controlled in response to a variation in the current load or currently required output of the vehicle engine.

The intake air sensor used for calculating the intake air quantity QN is usually disposed upstream of the engine, and is located a considerable distance away from a combustion chamber of the engine. Accordingly, there is a time lag between the moment of detection of an air flow by the intake air sensor, and the moment when the air flow as detected by the sensor reaches the engine combustion chamber, passing a throttle valve disposed between the sensor and the engine. Further, there is a certain volume of an air flow path between the throttle valve and the intake valve of the engine. This volume of the air flow path causes a difference between the intake air amount as calculated from the output of the intake air sensor and the actual amount of air currently flowing into the combustion chamber. Assuming, for example, that the throttle valve is rapidly opened for acceleration of the vehicle, at point of time t1 as indicated at (C) in FIG. 21, the amount of air flow at the position of the intake air sensor is a sum of the air quantity necessary to fill the volume of the above-indicated air flow path which has been at a considerably reduced pressure, and the air quantity which enters the combustion chamber. Consequently, the intake air quantity Q calculated from the currently obtained output of the intake air sensor is larger than the air quantity actually entering the combustion chamber, by an amount corresponding to the air quantity used to fill the volume of the air flow path between the throttle valve and the combustion chamber. As a result, the obtained intake air quantity QN as represented by solid line at (A) in FIG. 21 undergoes a sudden rise or overshoot, as indicated at I.

In the example of FIG. 21, the shift control pattern includes a first and a second shift-up boundary line $U_1$, $U_2$ indicated in one-dot chain lines at (A), for shifting up the transmission from the second-speed position to the third-speed position, and from the third-speed position to the fourth-speed position, and a first and a second shift-down boundary line $D_1$, $D_2$ indicated in dashed lines at (A), for shifting down the transmission from the fourth-speed position to the third-speed position, and from the third-speed position to the second-speed position. Suppose the transmission is currently placed in the fourth-speed position, the rapid increase in the throttle opening angle TA at point t1 causes the intake air quantity QN to exceed the levels of the first and second shift-down boundary lines $D_1$ and $D_2$, in this order, in a very short period of time (e.g., about 0.1 sec.), as a result of the overshoot indicated at I at (A). Consequently, the transmission is commanded to be shifted down by two steps, from the fourth-speed position down to the second-speed position. This two-step shift-down is unexpected to the vehicle driver, since the amount of increase in the throttle opening angle is not so large. Further, the transmission undergoes a shifting shock, leading to deterioration of the drivability of the vehicle. The shifting shock upon shifting of the transmission from the fourth-speed position to the second-speed position is particularly large, as compared with the other shift-down actions.

Since the overshoot I of the intake air quantity QN disappears in a very short time, the intake air quantity QN falls below the level of the first shift-up boundary line $U_1$ immediately after the shift-down action, as indicated at (A) in FIG. 21. Therefore, the transmission is shifted up to the third-speed position as soon as the shift-down to the second-speed position is completed, as indicated at (B). This phenomenon gives the vehicle driver an impression of a busy shift of the transmission.

It is considered possible to eliminate the overshoot I by using a moving average or a weighted average of the intake air quantity QN (intake air quantity per revolution of the engine). This solution suffers from a delayed down-shift action when a rapid down-shift is required for fast acceleration of the vehicle.

SUMMARY OF THE INVENTION

It is therefore an object of this invention to provide a shift control apparatus for an automatic transmission of a motor vehicle, which is capable of solving the problem experienced in the prior art as described above, by obtaining an intake air quantity of the vehicle engine from the throttle valve opening and the engine speed, and processing the obtained intake air quantity, to compensate the obtained intake air quantity for a time lag of first order.

The above object may be accomplished according to the principle of the present invention, which provides a shift control apparatus for an automatic transmission of a motor vehicle having an internal combustion engine, comprising: (a) throttle opening sensing means for detecting an opening of a throttle valve which regulates an intake air quantity supplied to the engine; (b) engine speed sensing means for detecting a speed of the engine; (c) vehicle speed sensing means for detecting a running speed of the vehicle; (d) calculating means for calculating the intake air quantity for a steady running of the vehicle, based on the detected opening of the throttle valve and the detected speed of the engine; (e) processing means for processing the calculated intake air quantity to compensate the calculated intake air quantity for a first-order time lag and obtain an estimated intake air quantity; and (f) automatic shift control means for automatically selecting an optimum operating position of said automatic transmission, based on the estimated intake air quantity and the detected running speed of the vehicle, according to a predetermined shift control pattern.

To describe the present shift control apparatus, reference is now made to the schematic block diagram of FIG. 1. The throttle opening sensing means 11 is provided to detect the throttle valve opening for regulating the intake air quantity supplied to the engine, while the engine speed sensing means 12 and the vehicle speed sensing means 13 are provided to detect the engine speed and the vehicle running speed, respectively. Further, the calculating means 14 is adapted to calculate the intake air quantity for a steady running of the vehicle, based on the detected throttle valve opening and engine speed. The processing means 15 processes the output of the calculating means, i.e., the calculated intake air quantity, to compensate it for a time lag of first order and obtain an estimated intake air quantity. Based on this estimated intake air quantity and the detected vehicle running speed, the automatic shift control means 16 automatically selects an optimum operating position of the automatic transmission according to the predetermined shift control pattern.

The intake air quantity calculated by the calculating means 14 based on the detected throttle valve opening and engine speed is for steady running of the vehicle with a constant amount of opening of the throttle valve as required by the vehicle driver, and represents the amount of air in the air intake system for the engine. In a transient running state of the vehicle, the amount of air in the air intake system gradually changes and eventually becomes equal to the calculated intake air quantity for steady running of the vehicle. In other words, the estimated intake air quantity obtained by the processing means 15 from the steady state intake air quantity calculated by the calculating means 14 is coincident with the amount of air in the air intake system during running of the vehicle in the transient state. Since the steady state intake air quantity supplied from the calculating means 14 to the processing means 15 does not include an overshoot component that would cause an overshoot as indicated at I in FIG. 21, the estimated intake air quantity obtained by the processing means 15 does not include such an overshoot component, whereby the transmission controlled according to the shift control pattern based on the estimated intake air quantity does not suffer from an unnecessary and unexpected shifting action or actions before the steady running of the vehicle as experienced in the prior art. Thus, the present shift control apparatus assures significantly reduced shifting shock of the transmission, and enhanced drivability of the vehicle.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 9 is a graph for explaining the transmission shift boundary lines for shifting the transmission;

FIG. 10 is a view for explaining a manner in which the transmission is shifted upon vehicle acceleration, according to the embodiment of FIGS. 5-9;

FIG. 11 is a flow chart showing a main routine in another embodiment of this invention;

FIG. 12 is a flow chart illustrating a sub-routine in the main routine of FIG. 11, for calculating intake air quantity;

FIG. 20 is a flow chart illustrating an interruption routine implemented during interruption of the main routine of FIG. 11;

FIGS. 21A, 21B and 21C are views showing a manner in which a vehicle transmission is shifted upon vehicle acceleration, by a known shift control apparatus;

DETAILED DESCRIPTION OF THE PREFERRED EMBODIMENTS

Figure 2:
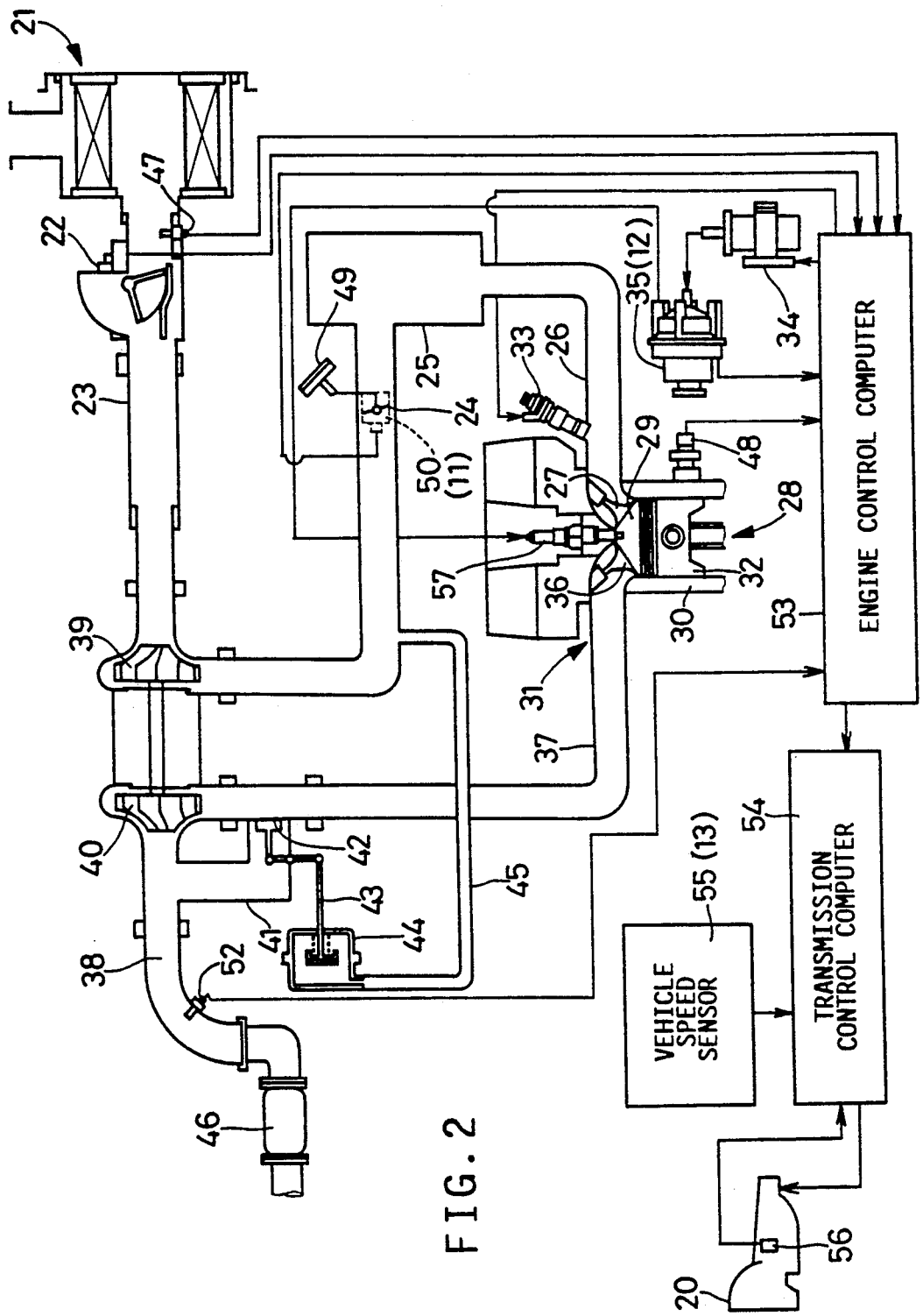
FIG. 2 is a schematic view showing an internal combustion engine and related components, and a control system for controlling the engine and the automatic transmission, the control system incorporating one embodiment of a shift control apparatus of the present invention.

Referring first to FIG. 2, there is schematically shown a part of a motor vehicle, including an automatic transmission 20, an engine assembly with an internal combustion engine 28, and a control system for controlling the transmission and engine 20, 28. The engine 28 is a 6-cylinder spark-ignition type engine equipped with a turbocharger. The control system incorporates a shift control apparatus for the transmission 20, which is constructed according to one embodiment of this invention, as described below.

The engine assembly includes an air cleaner 21, an air flow meter 22, an intake pipe 23, a throttle valve 24, a surge tank 25, and an intake manifold 26, which are arranged in the order of description, in the direction from the air cleaner 21 toward the engine 28, so that air from the air cleaner 21 flows into the engine 28, with the intake manifold 26 communicating with combustion chambers 29 of the engine 28 through intake valves 27.

The engine 28 has a cylinder block 30 and a cylinder head 31. The cylinder block 30 has six cylinders accommodating respective six pistons 32, while the cylinder head 31 has a spark plug 57 for each cylinder. Each spark plug 57 is disposed such that its gap is located within the corresponding combustion chamber 29. The intake manifold 26 is provided with a fuel injector valve 33 for each cylinder, such that the fuel injector valve 33 communicates with the interior of the manifold 26.

The engine assembly further includes an ignitor 34 which produces a high voltage, in response to an ignition signal from an engine control computer 53, which is a microcomputer. The high voltage produced by the ignitor 34 is applied to the spark plug 57 through a distributor 35. Each combustion chamber 29 of the engine 28 communicates with an exhaust pipe 38 through an exhaust valve 36 and an exhaust manifold 37.

A compressor 39 is disposed in the intake pipe 23 upstream of the throttle valve 24, and a turbine 40 is disposed in the exhaust pipe 38, such that the compressor 39 and the turbine 40 are coaxially fixed to each other. The exhaust manifold 37 and the exhaust pipe 38 on the upstream and downstream sides of the turbine 40 communicate with each other through a by-pass passage 41. A waste gate valve 42 is provided at the end of the by-pass passage 41 which is connected to the exhaust manifold 37. This waste gate valve 42 is opened and closed by an actuator 44 through a link mechanism 43. The actuator 44 is operated by an air pressure supplied from the intake pipe 23 through a passage 45. The turbine 40 is rotated by the exhaust gas flowing from the exhaust manifold 37 to the exhaust pipe 38, whereby the compressor 39 in the intake pipe 23 is rotated so as to compress a stream of air from the air flow meter 22. The compressed air in the intake pipe 23 is fed into each combustion chamber 29 of the engine 28 through the surge tank 25 and intake manifold 26. Thus, the compressor 39, turbine 40, waste gate valve 42, actuator 44, etc. constitute a turbocharger. If the pressure (boost pressure) of the intake air compressed by the turbocharger 39-45 is lower than a preset lower limit, the actuator 44 is in the non-operated position, and the waste gate valve 42 is in the closed position, whereby the entire volume of the exhaust gas from the engine 28 is admitted into the turbine 40. If the boost pressure exceeds the preset lower limit at a relatively high speed of the engine 28, the actuator 44 is operated by the boost pressure of the air in the intake pipe 23 applied thereto through the passage 45, and the waste gate valve 42 is operated through the link mechanism 43, to its open position (left position as seen in FIG. 2) for fluid communication between the exhaust manifold 37 and the exhaust pipe 38, whereby a portion of the exhaust gas in the exhaust manifold 37 by-passes the turbine 40, flowing through the by-pass passage 41. As a result, the rotating speed of the turbine 40 is lowered. Thus, the boost pressure of the air compressed by the compressor 39 is controlled to a predetermined constant level depending upon the present lower limit indicated above.

Figure 3:
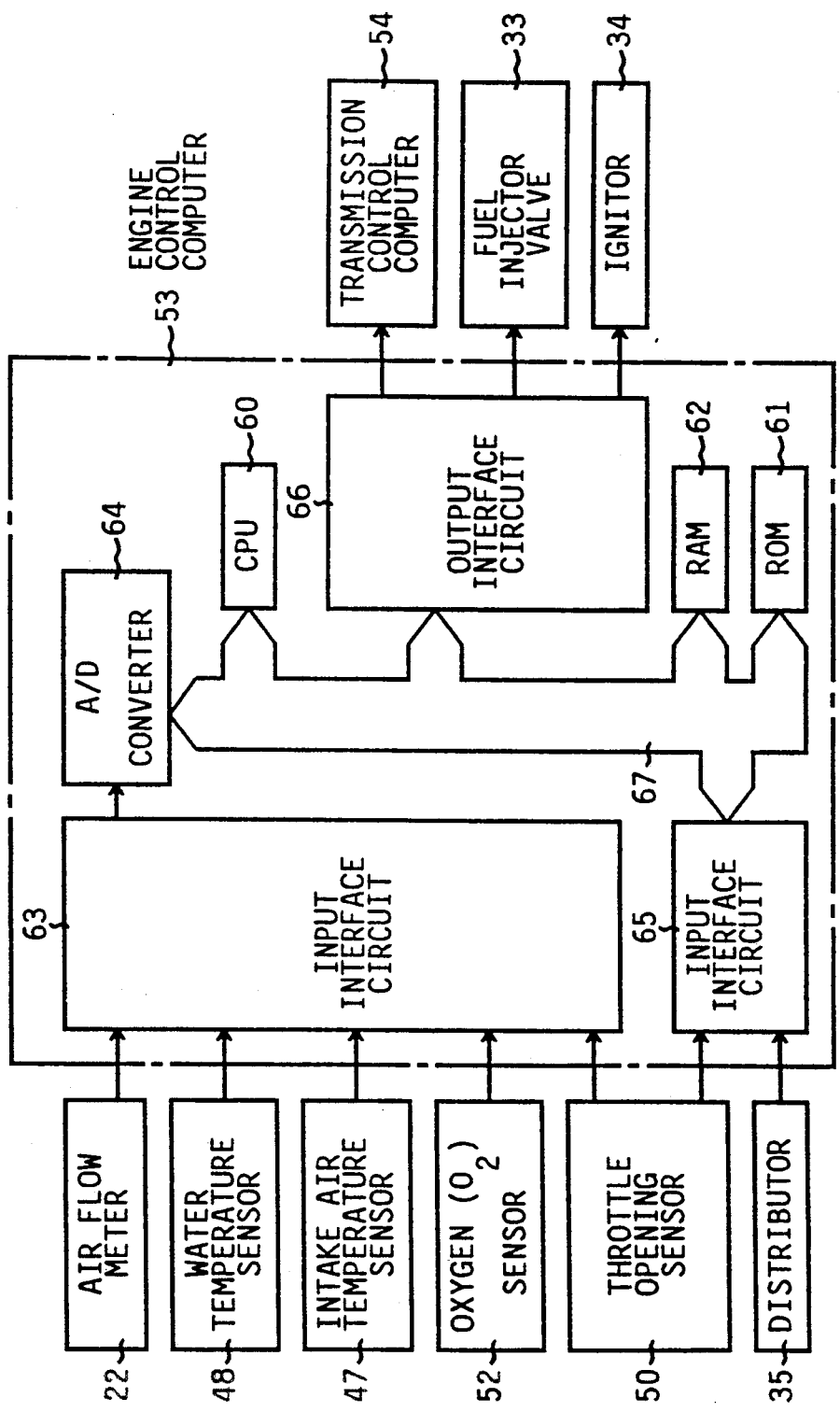
FIG. 3 is a block diagram showing various elements of the control system, including an engine control computer and a transmission control computer.

As shown in FIG. 3, the control system for the engine 28 and transmission 20 uses various sensors which include: an intake air temperature sensor 47 for detecting the temperature of the air flowing through the air flow meter 22; a water temperature sensor 48 whose probe penetrates the wall of the engine block 30 so as to project into the water jacket, for detecting the temperature of a coolant for the engine 28; a throttle opening sensor 50 for detecting the amount of opening of the throttle valve 24 which is operated by an accelerator pedal 49 of the vehicle; an angular position sensor and a crank position sensor incorporated in the distributor 35; and an oxygen ($O_2$) sensor 52 whose probe projects into the exhaust pipe 38, for detecting the oxygen concentration of the exhaust gas downstream of a catalytic device 46. The angular position sensor generates a pulse for a predetermined angular increment of the engine crankshaft, in synchronization with the rotation of the shaft of the distributor 35, while the crank position sensor generates a crank position signal indicative of the ignition of one of the six cylinders of the engine 28.

The output signals of the various sensors described above are fed to the engine control computer 53, so that the computer 53 performs various logic and arithmetic operations to obtain various control parameters such as a fuel injecting time necessary to control the air/fuel ratio of the air-fuel mixture supplied to the engine 28, for instance, to maintain the air/fuel ratio at the stoichiometric value. The output signals of the engine control computer 53 are fed to the fuel injector valve 33, ignitor 34 and a transmission control computer 54.

The transmission control computer 54, which is also constituted by a microcomputer, is adapted to receive a vehicle speed signal from a vehicle speed sensor 55, and a shift position signal from a shift position sensor 56 provided on the transmission 20, as well as the output signals from the engine control computer 53, so that the transmission control computer 54 performs logic and arithmetic operations to determine the optimum shift control pattern for placing the automatic transmission 20 in an optimum one of a plurality of operating positions. The vehicle speed sensor 55 detects the vehicle running speed based on the rotation of the output shaft of the transmission 20.

Figure 1:
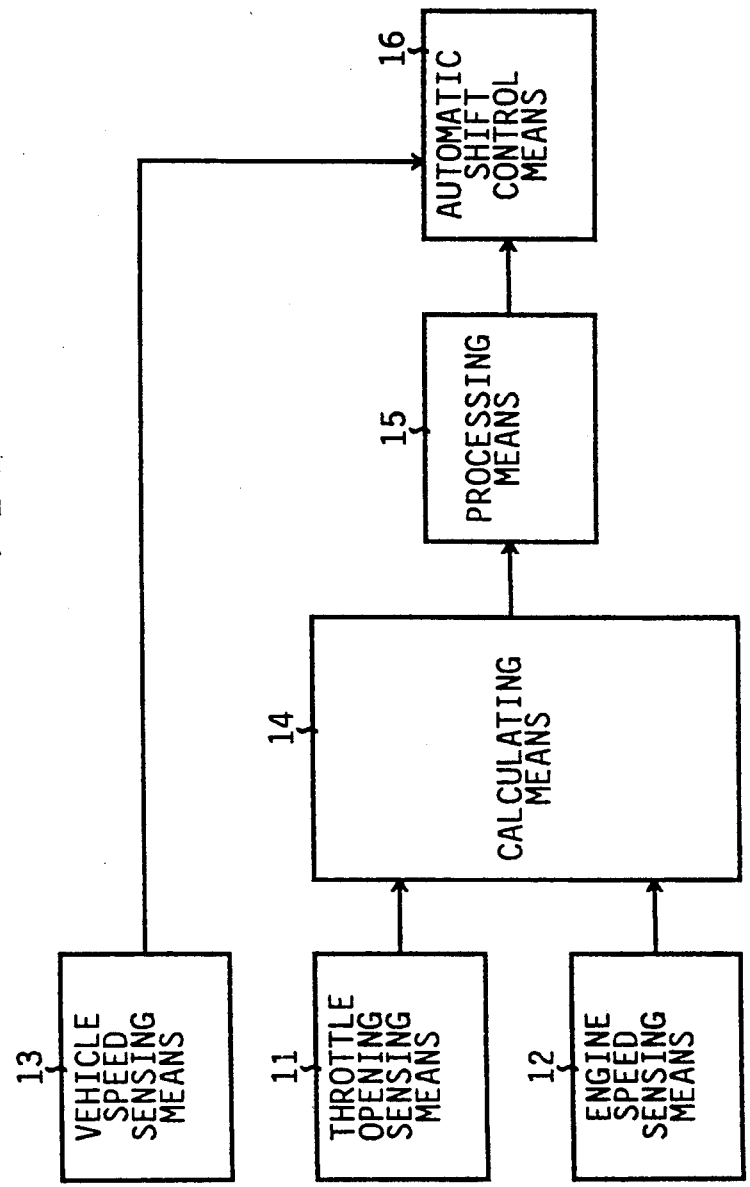
FIG. 1 is a block diagram schematically showing elements of a shift control apparatus for an automatic transmission of a motor vehicle, which is constructed according to the principle of the present invention.

It will be understood that the throttle opening sensor 50 and the distributor 35 (incorporating the angular position sensor) function as the throttle opening means 11 and the engine speed sensing means 12 shown in FIG. 1, respectively, while the vehicle speed sensor 55 serves as the vehicle speed sensing means 13 of FIG. 1. It will further be understood that the engine control computer 53 functions as the calculating and processing means 14, 15 of FIG. 1, while the transmission control computer 54 function as the automatic shift control means 16 of FIG. 1.

The engine control computer 53 is constructed as shown in FIG. 3. Namely, the engine control computer 53 includes a central processing unit (CPU) 60, a read-only memory (ROM) 61 storing various control programs and data maps, a random-access memory (RAM) 62 for temporarily storing various data during operation of the CPU 60, input interface circuits 63, 65, an analog/digital (A/D) converter 64, an output interface circuit 66, and a bus 67 for interconnecting the elements.

The CPU 60 operates to calculate intake air quantity QNTA for steady running of the vehicle, and estimated intake air quantity QNFWD by processing the intake air quantity QNTA to compensate it for a time lag of first order, and performs other calculating and processing operations, according to appropriate control routines as described below. The ROM 61 stores various data maps necessary for calculations for controlling the transmission 20. The input interface circuit 63 receives the output signals from the air flow meter 22, intake air temperature sensor 47, water temperature sensor 48, oxygen sensor 52 and throttle opening sensor 50, and apply the received signals to the A/D converter 64. The A/D converter 64 converts the received analog signals from the input interface circuit 63, into the corresponding digital signals, at the appropriate timings, and applies the digital signals to the CPU 60 through the bus 67. The input interface circuit 65 receives from the distributor 35 an engine speed signal representative of the speed NE of the engine 28, and applies this engine speed signal to the CPU 60 through the bus 67. The output interface circuit 66 receives various signals from the CPU 60 through the bus 67, and applies those signals selectively to the fuel injector valve 33, ignitor 34 and transmission control computer 54. The transmission control computer 54 has a hardware arrangement similar to that of the engine control computer 53, including a central processing unit, a read-only memory, a random-access memory, etc.

There will next be described a manner of obtaining the estimated intake air quantity QNFWD, the understanding of which is essential to understand the principle of the present invention. While the present embodiment is adapted to control the amount of fuel injected into the engine 26, based on the intake air quantity and the speed NE of the engine 28, it is possible to use the intake pipe pressure (pressure in the intake pipe 23) per revolution of the engine 28, rather than the intake air quantity, for controlling the fuel injecting amount, since the intake pipe pressure corresponds to the intake air quantity. In this instance, the intake pipe pressure is detected by a pressure sensor provided at the surge tank 25 downstream of the throttle valve 24.

However, a change in the intake pipe pressure detected by the pressure sensor is delayed with respect to the change in the actual intake pipe pressure, due to a delayed response of the pressure sensor, during running of the vehicle in a transient state with the changing intake pipe pressure. In the light of this drawback, the assignee of the present application developed a system for obtaining an estimated intake pipe pressure PMFWD, based on the throttle valve opening and the engine speed which do not suffer from a time delay. This system is disclosed in laid-open Publication No. 2-42160 (published in 1990) of unexamined Japanese Patent Application More specifically, the intake pipe pressure for steady running of the vehicle is first calculated. The calculated intake pipe pressure is then processed for compensation for a first-order time lag, to obtain a compensated intake pipe pressure free of a time delay. Further, the intake pipe pressure at the moment of closure of the intake valve at which the intake air quantity admitted into the engine combustion chamber is fixed is estimated. The obtained compensated intake pipe pressure and the estimated intake pipe pressure at the time of closure of the intake valve are compared to obtain a difference therebetween, and the estimated intake pipe pressure PMFWD is calculated based on the obtained difference.

Figure 4:
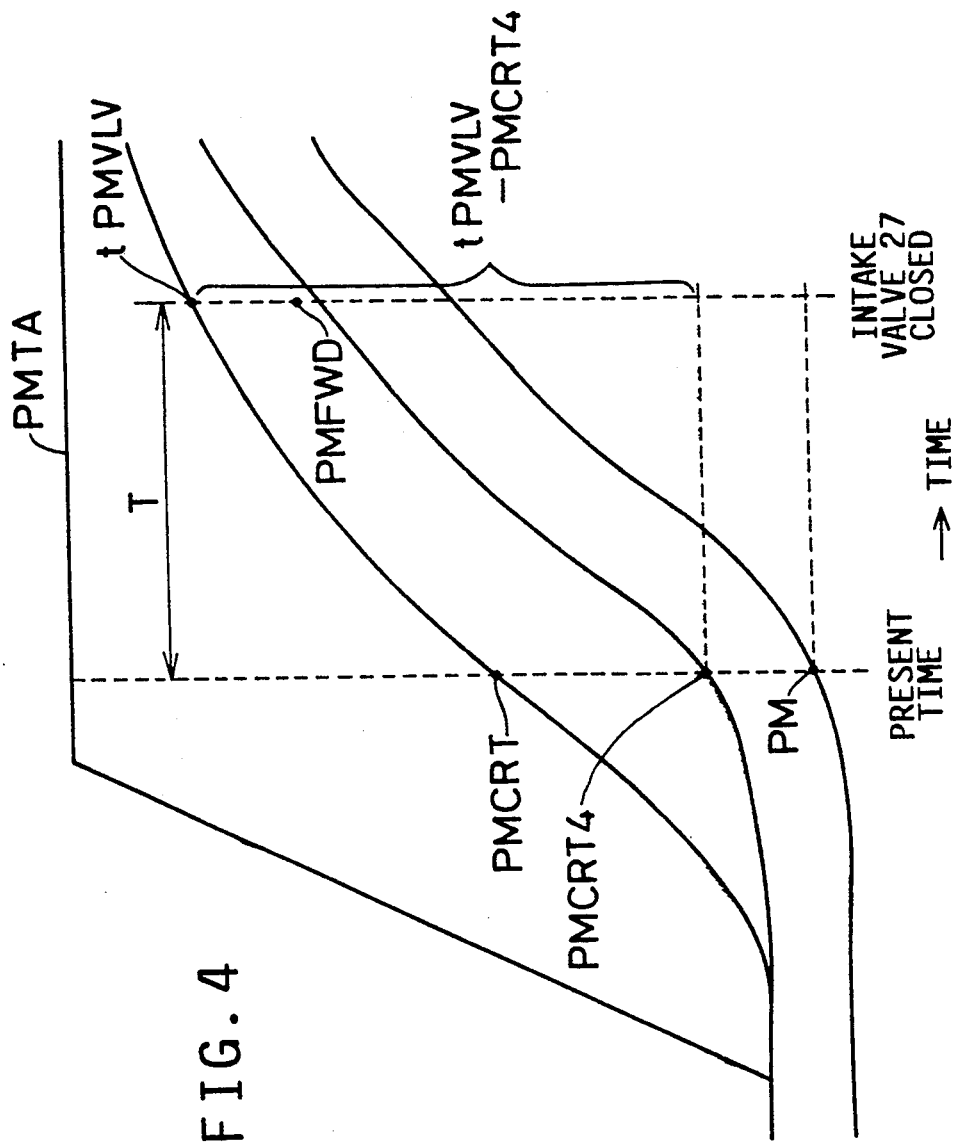
FIG. 4 is a graph for explaining a manner of estimating an intake pipe pressure, proposed by the assignee of the present application.

More specifically, the system disclosed in the above-identified publication is adapted such that an intake pipe pressure PMTA for steady running of the vehicle is calculated on the basis of the throttle valve opening TA and the engine speed NE. The calculated intake pipe pressure PMTA changes as shown in FIG. 4, without a time lag with respect to an increase in the throttle valve opening TA during acceleration of the vehicle. The actual intake pipe pressure, on the other hand, changes with a first-order time lag with respect to the calculated intake pipe pressure PMTA, as the throttle opening TA increases. Therefore, the calculated intake pipe pressure PMTA is processed for compensation for the first-order time lag, to obtain a compensated value PMCRT, as indicated in FIG. 4.

Then, the compensated value PMCRT is processed for another compensation for the first-order time lag, to obtain a smoothed value PMCRT4 whose response is similar to that of an intake pipe pressure PM detected by the pressure sensor. The smoothed value PMCRT4 is calculated at an interval which is equal a half of the calculating period $\Delta T$ of the value PMCRT. The smoothed value PMCRT4 is substantially equal to the detected pressure PM, if there are no changes in the atmospheric pressure and the opening of an idling speed control valve of the engine.

It is assumed that the intake valve 27 closes a time T after the present time. The time T is divided by the calculating period $\Delta t$ of the value PMCRT. The value $T/\Delta t$ obtained represents the number of repetition of the calculation of a value tAi according to the following equation. The initial value $tA_0$ in the first calculation is equal to the value PMCRT. With the calculation repeated $T/\Delta t$ times, an estimated value tPMVLV at the time of closure of the intake valve is eventually obtained.

$$tA_i = tA_{i-1} + TIM \times (PMTA - tA_{i-1})$$

The value tPMVLV can be used as the estimated intake pipe pressure PMFWD if the value compensated PMCRT4 is equal to the detected pressure PM. Actually, however, there exists a difference between these values, and the estimated intake pipe pressure PMFWD is obtained by adding the detected pressure PM to the difference (tPMVLV−PMCRT4) between the value tPMVLV at the time of closure of the intake valve and the current value PMCRT4.

In the present embodiment, the amount of fuel injected into the engine 28 is controlled on the basis of the intake air quantity and the engine speed NE. The output of the air flow meter 22 disposed upstream of the throttle valve 24 is advanced in phase than the intake pipe pressure PM described above. Therefore, the intake air quantity QN per revolution of the engine 28 as detected by the air flow meter 22 is processed for compensation for the first-order time lag, to obtain a value QNSM according to the equation (3) which will be described. The value QNSM corresponds to the detected intake pipe pressure PM, so that the estimated intake air quantity QNFWD can be obtained in the present embodiment, according to a principle similar to that of the above-described system adapted to obtain the estimated intake pipe pressure PMFWD.

Referring to the flow chart of FIG. 5, there will be described a routine for obtaining the estimated intake air quantity QNFWD. This routine is implemented by the engine control computer 53 at a cycle time of 8 msec., for example. The routine starts with step S101 in which the CPU 60 reads in the intake air quantity QN detected by the air flow meter 22, the throttle valve opening TA detected by the throttle opening sensor 50, and the speed NE of the engine 28 detected by the angular position sensor incorporated in the distributor 35.

Step 101 is followed by step S102 in which an intake air quantity QNTA for steady running of the vehicle is calculated on the basis of the throttle valve opening TA and engine speed NE, and according to a data map stored in the ROM 61. The data map represents a relationship among these values TA, NE and QNTA. This data map is prepared by measuring the quantity QNTA at different values of the throttle valve opening TA and engine speed NE during steady running of the vehicle. Thus, step S102 corresponds to the calculating means 14 described above.

Figure 22:
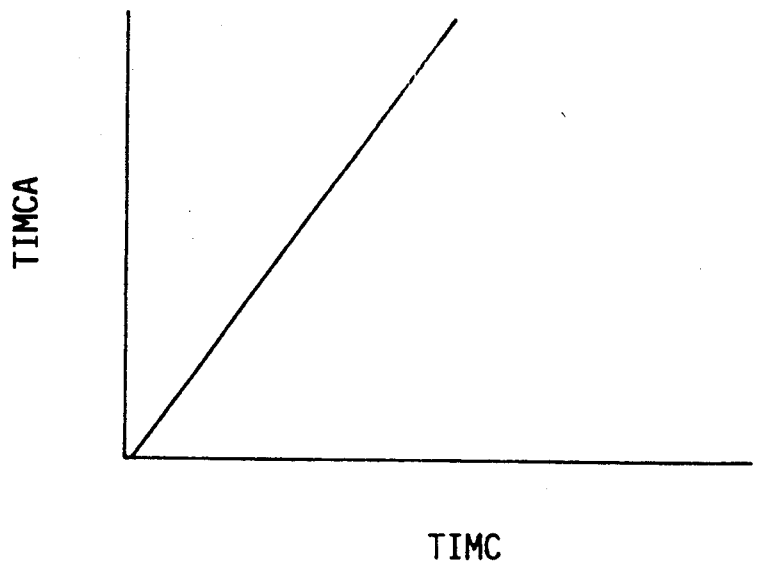
FIG. 22 is a graph showing a data map used in step S103 of the flow chart of FIG. 5.

Then, steps S103–S110 are implemented to process the intake air quantity QNTA for steady running of the vehicle, to compensate the quantity QNTA for the first-order time lag. These steps S103–S110 corresponds to the processing means 15 described above. Namely, step S103 is implemented to calculate a variable TIMCA equivalent to a time constant for the first-order time lag, on the basis of the engine speed NE and the quantity QNTA, and according to a data map stored in the ROM 61. This data map represents a relationship among NE, QNTA and TIMCA, as indicated in the graph of FIG. 22. The variable TIMCA is smaller than 1. Then, step S104 is executed to calculate a compensated value QNCRT equivalent to the compensated value PMCRT, according to the following equation (1):

$$QNCRT_i = QNCRT_{i-1} + (QNTA - QNCRT_{i-1}) \times TIMCA \quad (1)$$

In the equation (1), "$QNCRT_{i-1}$" represents the value QNCRT obtained in the last calculation cycle.

Step S104 is followed by step S105 in which the compensated value QNCRT is processed for another first-order time lag compensation, according to the following equation (2), to calculate a smoothed value QNCRT4 whose response is similar to that of a smoothed value QNSM of the output of the air flow meter 22:

$$QNCRT4_i = QNCRT4_{i-1} + (QNCRT - QNCRT4_{i-1}) \times K \quad (2)$$

In the above equation (2), "$QNCRT4_{i-1}$" represents the value QNCRT4 obtained in the last calculation cycle, and "K" is a constant for compensation of the value $QNCRT4_{i-1}$ for a response delay of the air flow meter 22 due to its location upstream of the throttle valve 24. The constant K is smaller than 1.

Figure 23:
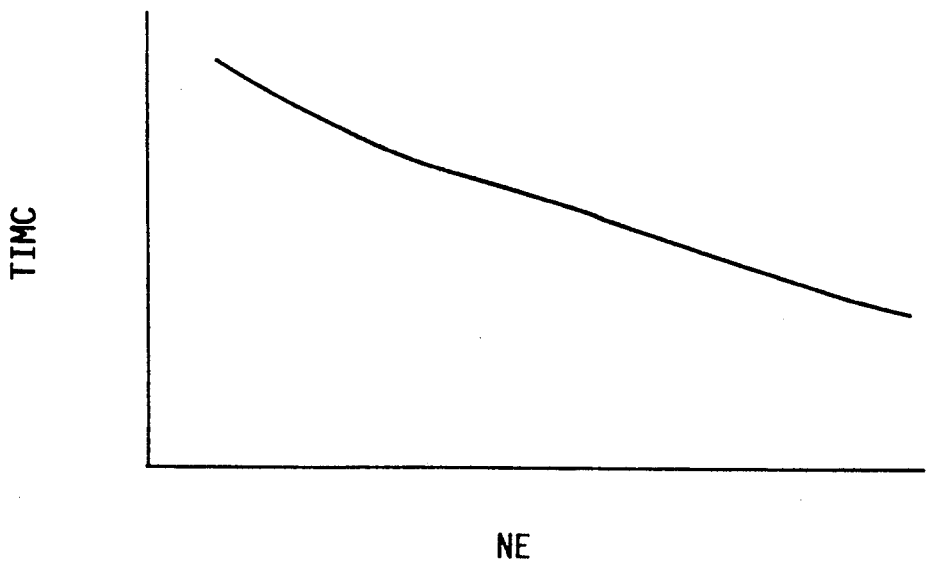
FIG. 23 is a graph showing a data map used in step S106 of the flow chart of FIG. 5.

The control flow then goes to step S106 to calculate a variable TIMC (smaller than 1) equivalent to a time constant, on the basis of the engine speed NE and according to a data map stored in the ROM 61. FIG. 23 shows an example of this data map. Step S107 is then implemented to calculate the above-indicated smoothed value QNSM of the intake air quantity, according to the following equation (3). The value QNSM is equivalent to the intake pipe pressure PM described above.

$$QNSM_i = QNSM_{i-1} + (QN - QNSM_{i-1}) \times TIMC \quad (3)$$

In the above equation (3), the smoothed value $QNSM_i$ is compensated by the variable TIMC, to have a response depending upon the engine speed NE. "$QNSM_{i-1}$" represents the value QNSM obtained in the last calculation cycle.

Figure 24:
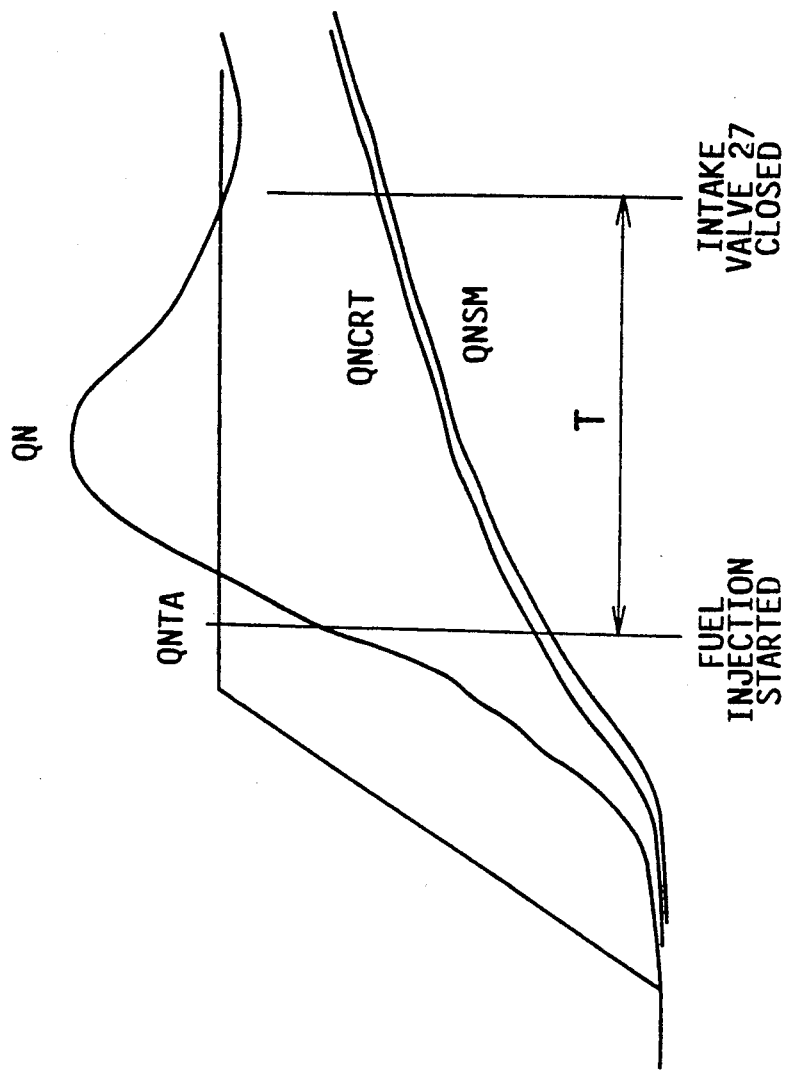
FIG. 24 is a graph showing a time period calculated in step S108 of the flow chart of FIG. 5.

Step S107 is followed by step S108 to calculate a time period T, as indicated in FIG. 24, between the moment at which the fuel injector valve 33 is open for fuel injection into the combustion chamber 29 through the intake valve 27, and the moment when the intake valve 27 is closed, i.e., the moment at which the amount of air admitted into the combustion chamber 29 of the engine 28 is fixed. In the following step S109, a smoothed value T/Δt is calculated, where Δt is the cycle time (e.g., 8 msec.) of the present QNFWD calculating routine. Then, a value $tA_i$ is repeatedly calculated according to the following equation (4).

$$tA_i = tA_{i-1} + TIMCA \times (QNTA - tA_{i-1}) \quad (4)$$

In the above equation (4), "$tA_{i-1}$" represent the smoothed value tA obtained in the last calculation cycle. The initial value $tA_0$ in the first calculation is equal to the value PMCRT.

The control flow then goes to step S110 in which the estimated intake air quantity QNFWD at the time of closure of the intake valve 27 is calculated according to the following equation (5), which includes the smoothed value $tA_i$ obtained with the above equation (4) solved T/Δt times.

$$QNFWD = QNSM + (tA_i - QNCRT4) \quad (5)$$

Figure 5:
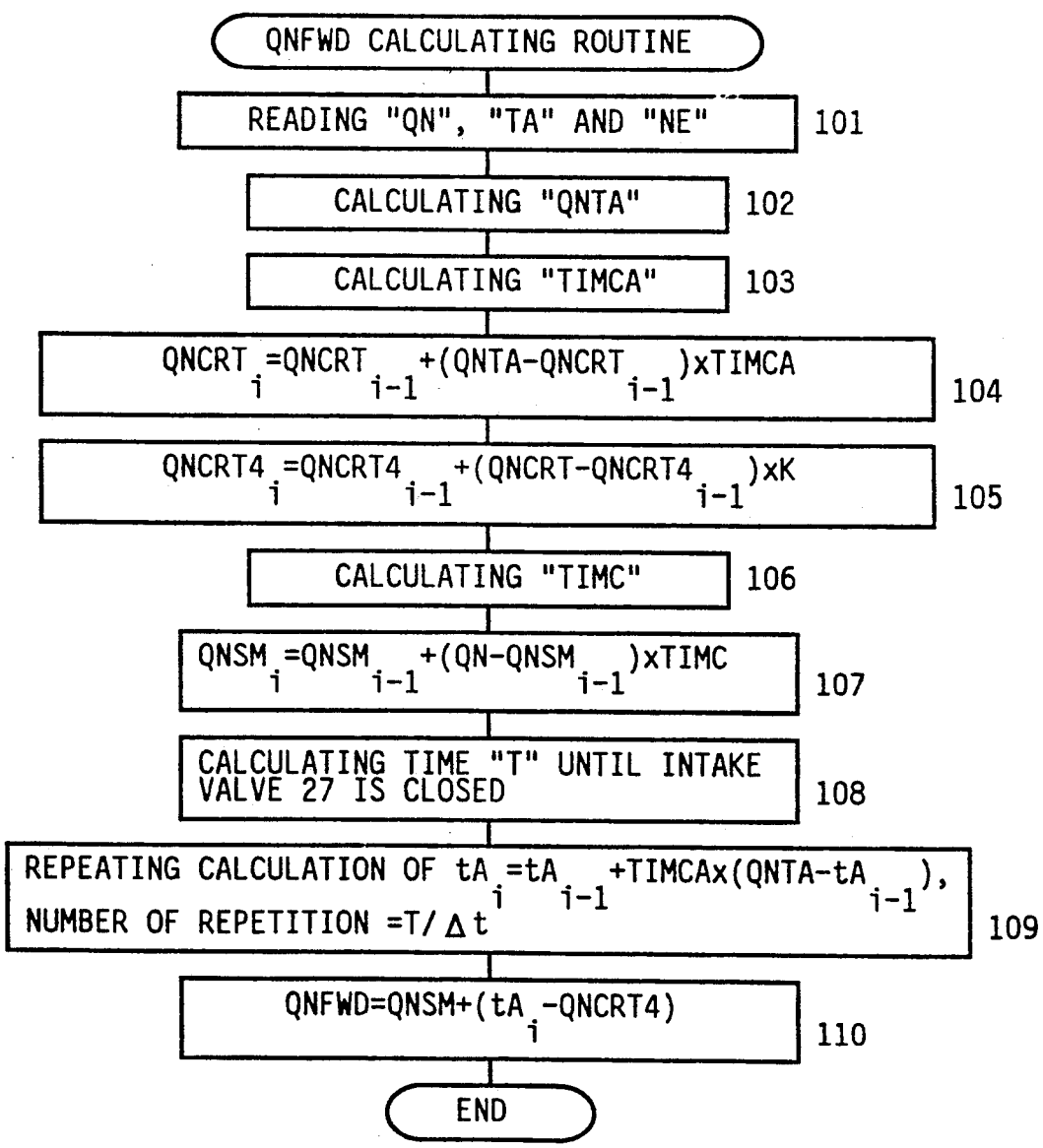
FIG. 5 is a flow chart illustrating a calculating routine implemented in one embodiment of the invention.

The calculated estimated intake air quantity QNFWD is stored in the RAM 62, and the calculation routine of FIG. 5 is terminated. This estimated intake air quantity QNFWD, which is obtained by processing the steady state intake air quantity QNTA for compensation for the first-order time lag of the output of the throttle opening sensor 50, is equivalent to the estimated intake pipe pressure PMFWD described above.

Referring next to the flow chart of FIGS. 6 and 7, there will be described an operation performed by the transmission control computer 54 which executes a routine for selecting the shift control pattern in the form of shift boundary lines, and shifting the transmission 20, according to the selected shift boundary lines. Thus, the transmission control computer 54 functions as the automatic shift control means 16 of FIG. 1.

Initially, step S201 is executed to read in the estimated intake air quantity QNFWD from the engine control computer 53. This quantity QNFWD is used as the intake air quantity QN per resolution of the engine 28. Step S202 is then executed to read in the throttle opening TA from the engine control computer 53.

Figure 8:
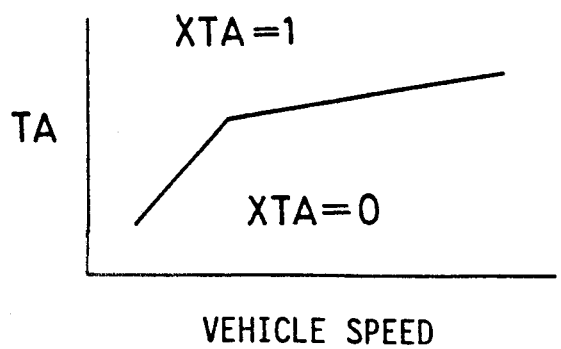
FIG. 8 is a graph for explaining a QN-TA flag used in the calculating routine of the flow chart of FIGS. 6 and 7.

The control flow then goes to step S203 to set or reset a QN-TA selector flag XTA, on the basis of the throttle opening TA and the vehicle running speed detected by the vehicle speed sensor 55, and according to a data map stored in the ROM 61. This data map represents a relationship among the value TA, vehicle speed and XTA value, as shown in FIG. 8. The flag XTA is set to "1" when the value TA is relatively large, while the flag is set to "0" when the value TA is relatively low. However, the flag XTA is determined also by the vehicle speed.

Step S203 is followed by step S204 to detect the currently selected operating position of the automatic transmission 20, based on the output of the shift position sensor 56. Then, step S205 is implemented to select one of shift-up boundary lines which corresponds to the current position, namely, select the shift-up boundary line for shifting up the transmission 20 from the current position. The shift-up boundary lines are represented by a data map stored in the ROM 61, and each shift-up boundary line represents a relationship between the vehicle speed and intake air quantity QN (=QNFWD). Then, step S206 is implemented to determine whether the obtained shift-up boundary line is located on the higher side of the currently detected vehicle speed, or not. If the shift-up boundary line is on the higher side of the vehicle speed, step S206 is followed by step S207 in which a shift-down boundary line QNSPD for shifting down the transmission is similarly selected. A data map representing the shift-down boundary lines is also stored in the ROM 61. If the shift-up boundary line is on the lower side of the vehicle speed, step S206 is followed by step S208 in which the transmission control computer 54 commands the automatic transmission 20 to be shifted up to the next high-gear position, and the routine of FIGS. 6 and 7 is terminated.

Figure 6:
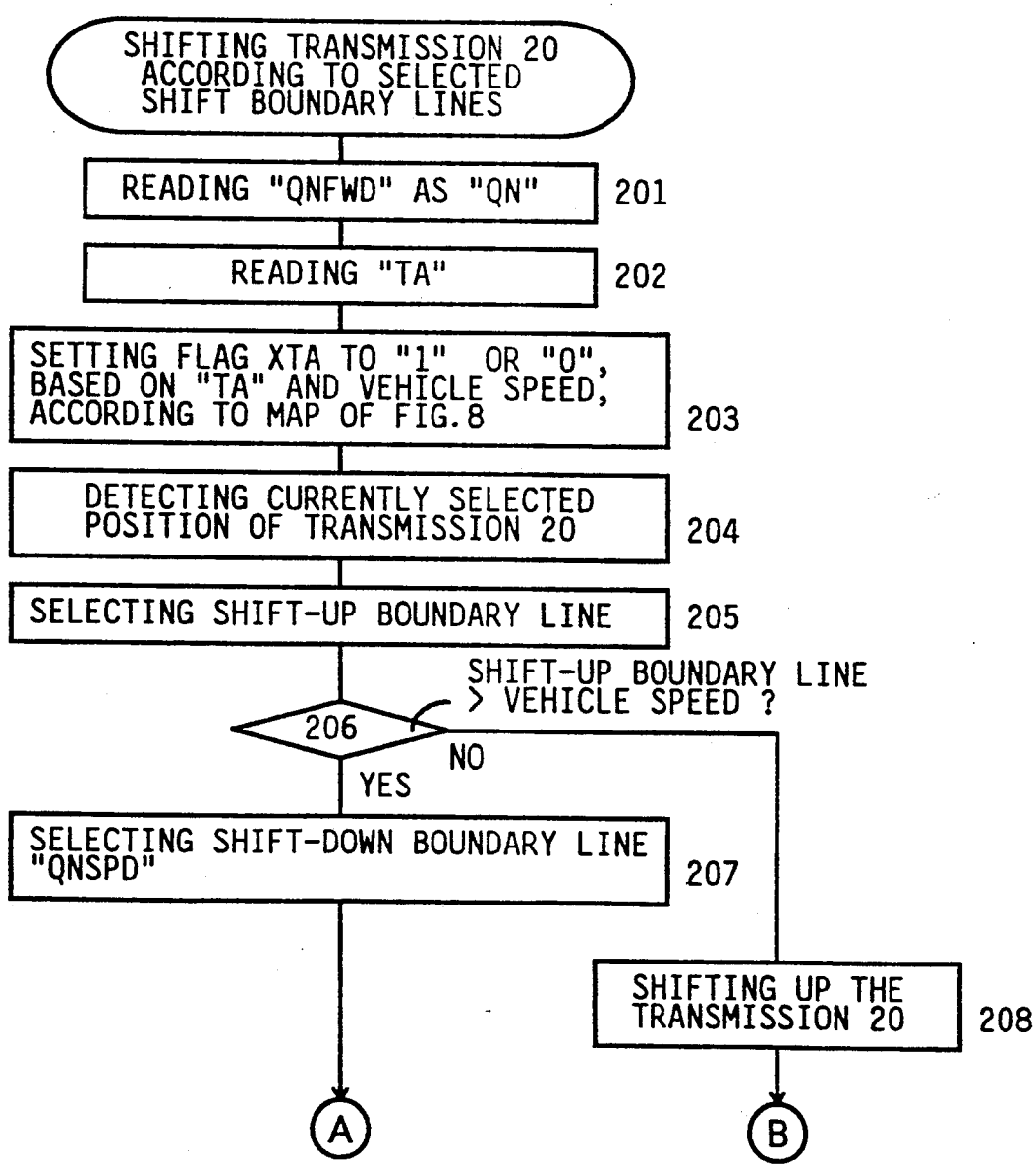
FIGS. 6 and 7 are a flow chart illustrating a routine for shifting the transmission according to selected shift boundary lines in the same embodiment.
Figure 7:
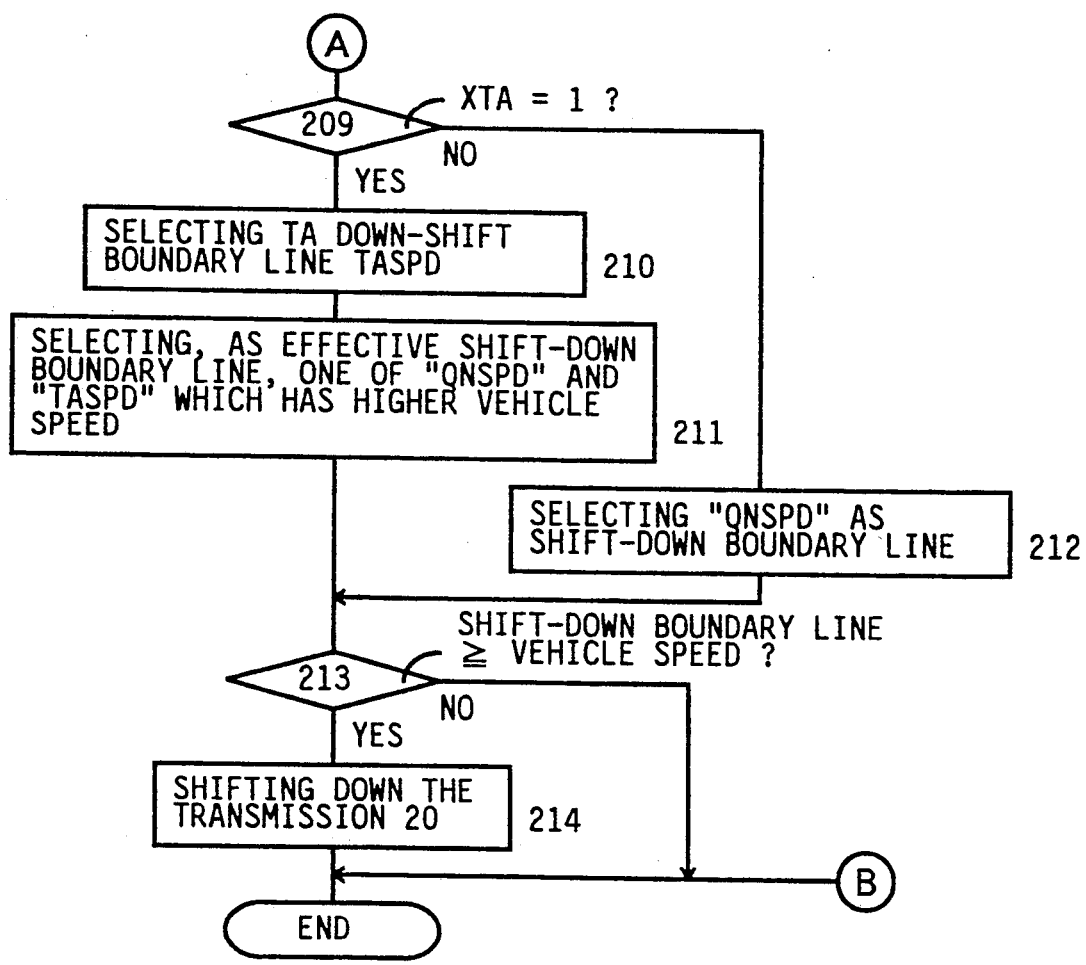

The graph of FIG. 9 shows an example of the transmission shift control pattern consisting of a plurality of shift-up and shift-down boundary lines, which are selected in the routine of FIGS. 6 and 7. In the graph, the shift-up boundary lines as selected in step S205 are indicated in solid lines, while the shift-down boundary lines QNSPD as selected in step S207 are indicated in dashed lines.

Step S207 is followed by step S209 (FIG. 7) to determine whether the QN-TA selector flag XTA is set at "1" or not. If the flag XTA is set at "1", step S210 is implemented to select one of shift-down boundary lines TASPD which corresponds to the current position of the transmission, namely, select the shift-down boundary line for shifting down the transmission 20 from the current position. The shift-down boundary lines are represented by a data map stored in the ROM 61, and each shift-down boundary line represents a relationship between the vehicle speed and throttle opening TA. Step S211 is then implemented to compare the two shift-down boundary lines QNSPD and TASPD, and select as the effective shift-down boundary line one of these two lines which has a higher vehicle speed (which is to the right of the other one as seen in the graph of FIG. 9). In the graph of FIG. 9, the shift-down boundary lines TASPD are indicated in one-dot chain lines. If the flag XTA is set at "0", step S209 is followed by step S212 in which the shift-down boundary line QNSPD is selected as the effective shift-down boundary line.

The selection of the shift-down boundary line QNSPD or TASPD as the effective shift-down boundary line depends upon the value of the QN-TA flag XTA, for the following reason. Namely, the torque of the engine 28 reaches 90% or higher of the maximum torque when the throttle opening TA is 50-60%, in the shift control arrangement in which the shift boundary lines represent the relationship between the intake air quantity QN and the vehicle speed. Accordingly, the depression of the accelerator pedal 49 to increase the throttle opening TA to a level higher than 60% for more acceleration of the vehicle will not result in a considerable increase in the engine torque. Thus, the vehicle acceleration is bottomed at about 60% opening TA of the throttle valve 24. In view of this, the shift-down boundary line QNSPD representing the relationship between the intake air quantity QN and the vehicle speed (steps S207 and S212) is normally used, since the quantity QN normally represents the engine torque with relatively high precision. Only when the intake air quantity QN is saturated with a relatively high value of the throttle opening TA, the QN-TA selector flag XTA is set to "1" (step S203), and the shift-down boundary line TASPD representing the relationship between the throttle opening TA and the vehicle speed (S210) is selected as the effective shift-down boundary line if the shift-down boundary line TASPD has a higher vehicle speed than the shift-down boundary line QNSPD (step S211).

On the other hand, the shift-up boundary lines representing the relationship between the intake air quantity QN and the vehicle speed is always used, even when the throttle opening TA is relatively high. That is, the QN-TA selector flag is not used for the shift-up boundary lines. While the throttle opening TA is 50% or higher, the engine torque is 90% or higher of the maximum value, as described above, and the engine torque will not appreciably change even if the shift-up boundary lines representing the relationship between the throttle opening TA and the vehicle speed are used. Further, it is difficult to determine the relationship between the throttle opening TA and the vehicle speed, for the shift-up boundary lines.

The selection of one of the shift-down boundary lines QNSPD and TASPD in step S211 is to give a freedom in effecting the shift-down action of the transmission 20, even if there is some degree of variation in the relationship between the intake air quantity QN and the throttle opening TA.

For example, the QN-TA selector flag XTA is set to "1" when the throttle opening TA is 50% or higher, as indicated in FIG. 9. In this case, the selection of the shift-down boundary line QNSPD or TASPD as the effective shift-down boundary line depends on whether the currently detected throttle opening TA is higher or lower than the value corresponding to the intersection of these two lines QNSPD and TASPD. For instance, when the transmission 20 is currently placed in the second-speed (2nd) or third-speed (3rd) position, the boundary line TASPD is selected if the current throttle opening TA is higher than 50%. When the fourth-speed (4th) position is currently selected, the boundary line QNSPD is selected if the current throttle opening TA is lower than 50-52%, and the boundary line TASPD is selected if the throttle opening TA is higher than 52%.

Steps S211 and S212 in FIG. 7 are followed by step S213 to determine whether the effective shift-down boundary line is located on the higher side of the currently detected vehicle speed, or not. If the effective shift-down boundary line is on the higher side of the current vehicle speed, step S214 is implemented to shift down the transmission 20, and the present routine is terminated in step S215. If the effective shift-down boundary line is not on the higher side of the current vehicle speed, the transmission 20 is not shifted down, and the routine is terminated (step S215). If the transmission 20 is currently placed in the fourth-speed (4th) position, and the vehicle speed and intake air quantity QN are 100 km/hr. and 1.5 L/rev. (as indicated at "a" in FIG. 9), respectively, for example, the QN-TA selector flag XTA is set at "0", and the 4th→3rd shift-down boundary line QNSPD indicated in dashed line is used as the effective shift-down boundary line. In step S213, therefore, a negative decision (NO) is obtained since the effective shift-down boundary line in question is on the lower side of the vehicle speed 100 km/hr., i.e., located to the left of the point "a". Accordingly, the transmission 20 is not shifted down.

If the vehicle running condition is as indicated at "b" in FIG. 9, namely, acceleration of the vehicle is required with the throttle opening TA set at about 80% while the vehicle is running at 100 km/hr., the 4th→3rd shift-down boundary line TASPD indicated in one-dot chain line is selected in step S210 since the flag XTA is set at "1". Further, this shift-down boundary line TASPD is selected as the effective shift-down boundary line in step S211, since the 4th→3rd shift-down boundary line TASPD is on the higher vehicle speed side of the 4th→3rd shift-down boundary line QNSPD. Since the 4th→3rd shift-down boundary line TASPD is on the higher side of the current vehicle speed 100 km/hr., an affirmative decision (YES) is obtained in step S213, and the transmission 20 is shifted down in step S214, whereby the vehicle is accelerated as required by the vehicle driver.

In the present embodiment, the estimated intake air quantity QNFWD obtained in step S110 in the routine of FIG. 5 is used as the intake air quantity QN per revolution of the engine 28, in step S201. This estimated intake air quantity QNFWD does not include an overshoot component even upon rapid opening of the throttle valve 24, since the estimated intake air quantity QNFWD is obtained from the intake air quantity QNTA for steady running of the vehicle, which is obtained from the throttle opening TA and the engine speed NE and which does not contain an overshoot component. Namely, the estimated intake air quantity QNFWD is obtained by compensating the quantity QNTA for the time lag of first order. Further, the estimated intake air quantity QNFWD is the intake air quantity estimated when the amount of air sucked into the combustion chamber 29 of the engine 28 is fixed, i.e., when the intake valve 27 is closed. Where the shift boundary lines $D_1$, $D_2$, $U_1$, $U_2$ are determined as indicated at (A) in FIG. 10 corresponding to FIG. 21, according to the present invention as illustrated in the flow charts of FIGS. 5-7, for example, the estimated intake air quantity QNFWD which does not include an overshoot component does not increase above the 3-2 shift-down boundary line $D_2$ for shifting from the third-speed position to the second-speed position after rising above the 4-3 shift-down boundary line $D_1$ for shifting from the fourth-speed position to the third-speed position, even if the throttle opening TA is rapidly increased as indicated at (C) in FIG. 10 while the transmission 20 is placed in the fourth-speed position. Accordingly, the transmission 20 is shifted down only once, from the fourth-speed position to the third-speed position after the increase in the throttle opening TA, as indicated at (B) in FIG. 10. The transmission 20 is not shifted down to the second-speed position as in the case of FIG. 21. Thus, the transmission 20 is shifted according to the driver's requirement for vehicle acceleration, as expressed by the throttle opening TA. Moreover, the transmission 20 is controlled so as to meet the actual operating condition of the engine 28, since the estimated intake air quantity QNFWD used for shifting down the transmission 20 substantially coincides with the actual quantity of air admitted into the combustion chamber 29.

It is noted that the engine 28 is provided with the turbocharger 39-45, an increase in the torque of the engine 28 tends to be more or less delayed with respect to the operation of the accelerator pedal 49, due to a time lag of the turbocharging operation. If the throttle opening TA and the vehicle speed are used for shifting down the transmission 20, the transmission will be shifted down almost concurrently with the depression of the accelerator pedal 49, since the throttle opening TA increases simultaneously with the depression of the accelerator pedal 49. Consequently, the engine speed will rise, together with an increase in the engine output owing to the effect of the turbocharging operation which takes place a short time after the depression of the accelerator pedal 49.

Under such condition, the vehicle driver is likely to release the accelerator pedal 49 to operate the throttle valve 24 to the closed position, whereby the transmission 20 is shifted up. Thus, the vehicle driver is given a bad feel about the shifting actions of the transmission 20, in particular, busy shifting phenomenon when the vehicle is running on an uphill.

In the present embodiment wherein an optimum operating position of the transmission 20 is selected based on the intake air quantity QNFWD, an increase in the throttle opening TA will not necessarily cause the quantity QNFWD to rise above the calculated shift-down boundary line, i.e., shift-down action, until the engine torque considerably increases. Therefore, the time lag of the turbocharger will not lead to busy shifting phenomenon of the transmission 20.

Although the present embodiment is adapted such that the shift-down boundary line QNSPD or TASPD is selectively used as the effective shift-down boundary line, depending upon the value of the QN-TA selector flag XTA, the flag XTA may be used also for the shift-up boundary lines. In this case, a shift-up boundary line representing the relationship between the throttle opening TA and the vehicle speed is used as the effective shift-up boundary line when the flag XTA is set at "1".

Referring next to FIGS. 11-20, another embodiment of the present invention will be described. This modified embodiment is adapted for a so-called "lean-burn engine" in which the air/fuel ratio of the air-fuel mixture is controlled to be close to a maximum value, that is, so that the engine 28 is operated with a fuel-lean air-fuel mixture, in order to improve the fuel economy and reduce the amounts of nitrogen oxides (NOx) in the exhaust emission of the engine. Usually, the air/fuel ratio of the engine is controlled to be maintained at the stoichiometric level. In this case, the transmission may be suitably controlled on the basis of the intake air quantity (QN) per revolution of the engine, as the parameter representative of the engine output.

However, the intake air quantity (QN) does not accurately represent the output of the engine where the engine operates with varying air/fuel ratio of the air-fuel mixture. In the lean-burn engine, the output may decrease even with the same intake air quantity (QN). In other words, the vehicle drive force will vary even with the same throttle opening and the same intake air quantity (QN). Accordingly, the vehicle drive force upon shifting of the transmission is not stable, and the transmission tends to suffer from a shifting shock and a busy shifting phenomenon.

To avoid the shifting shock and busy shifting phenomenon, the present embodiment which also uses the estimated intake air quantity QNFWD as the intake air quantity QN (per revolution of the engine 28) is adapted to reduce the intake air quantity QN when the air/fuel ratio of the engine is larger than a predetermined value in the lean-burn range.

To control the engine 28, a main routine as illustrated in FIG. 11 is executed by the engine control computer 53. The routine is started with step S300 to calculate the intake air quantity of the engine 28. Then, the control flow goes to step S400 in which the air/fuel ratio of the air-fuel mixture supplied to the engine 28 is calculated. Step S400 is followed by step S500 in which the fuel injecting time which determines the amount of fuel injection is calculated on the basis of the intake air quantity and engine speed, so as to establish the stoichiometric air/fuel ratio. Then, step S600 is implemented to calculate the spark advance amount of the engine 28.

The calculation of the intake air quantity in step S300 is implemented in a routine as illustrated in FIG. 12. Initially, step S301 is executed to read in the engine speed NE. Then, step S302 is executed to read in the estimated intake air quantity QNFWD (as obtained in step S110 of FIG. 5). Then, step S303 is implemented to calculate a compensated intake air quantity TQN according to the following equation (6):

$$TQN = QNFWD/|KF - KE| \quad (6)$$

In the above equation (6), "KF" represents a value indicative of the degree of leanness of the fuel in the air-fuel mixture. This value is 1.0 or larger. "KE" represents a value indicative of the degree of richness of the fuel. When the air/fuel ratio is in the lean-burn range, the engine torque is smaller than when the air/fuel ratio is equal to the stoichiometric value, even if the intake air quantity is the same. Therefore, the estimated intake air quantity QNFWD should be compensated for this reduction in the engine torque, according to the above equation (6), and the compensated value TQN is used as the effective intake air quantity. The variables "KF" and "KE" are determined in steps S406, S407 of FIG. 13 and step S506 of FIG. 16, which will be described.

Figure 13:
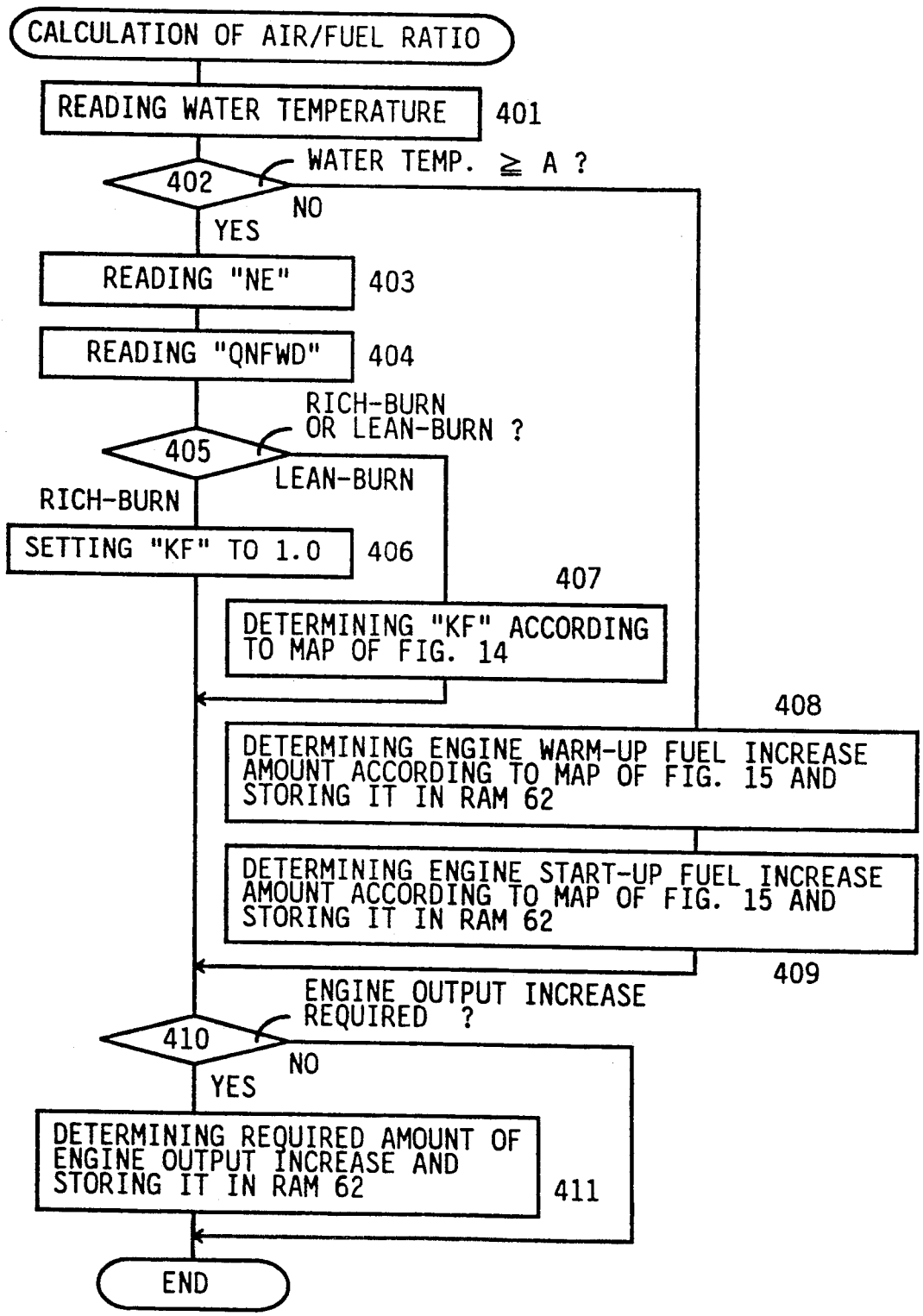
FIG. 13 is a flow chart illustrating another sub-routine in the main routine of FIG. 11, for calculating air/fuel ratio.
Figure 14:
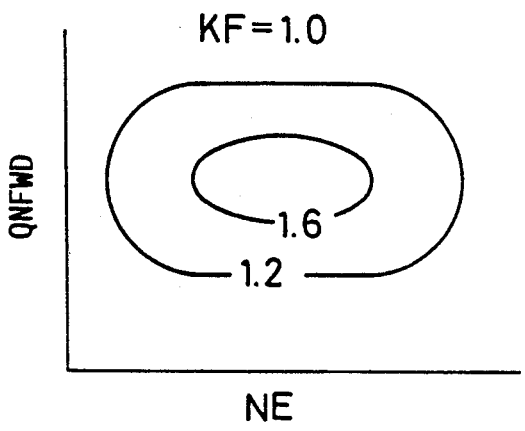
FIG. 14 is a graph showing a data map representative of a parameter KF used in the sub-routine of FIG. 13.

The calculation of the air/fuel ratio in step S400 of FIG. 11 is implemented in a routine as illustrated in FIG. 13. Initially, step S401 is executed to read in the water temperature detected by the water temperature sensor 48. Then, step S402 is executed to determine whether the water temperature is equal to or higher than a predetermined level A, or not, namely, whether the engine is in the warm-up mode or not. If the detected temperature is higher than (or equal to) the predetermined level A, step S403 and S404 are executed to read in the engine speed NE (detected by the distributor 35) and the estimated intake air quantity QNFWD. Step S404 is followed by step S405 to determine whether the air/fuel ratio is in the lean-burn range or in the rich-burn range. This determination is effected on the basis of the quantity QNFWD and engine speed NE, according to a data map as illustrated in FIG. 14. This data map is stored in the ROM 61. If the specific combination of QNFWD and NE lies in an area where KF is larger than 1.0, the air/fuel ratio is determined to be in the lean-burn range.

If the air/fuel ratio is determined in step S405 to be in the rich-burn range, step S406 is implemented to set the variable KF to "1.0". If the air/fuel ratio is determined to be in the lean-burn range, step S407 is implemented to determine the variable KF according to the data map of FIG. 14, which represents a relationship among the values QNFWD, NE and KF. The air/fuel ratio increases with an increase in the variable KF. In other words, the degree of leanness of the air-fuel mixture increases with an increase in the variable KF. The determined value K is stored in the RAM 62.

Figure 15:
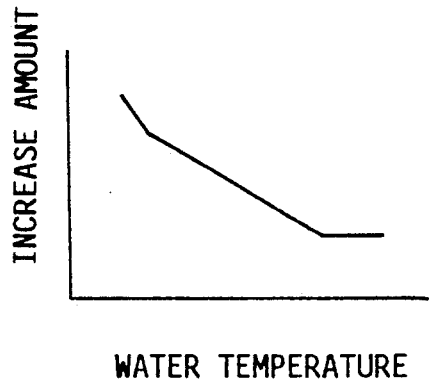
FIG. 15 is a graph showing a data map representative of an increment used in the sub-routine of FIG. 13.

If the water temperature is lower than the predetermined level A, that is, if the engine 28 has been just started or is in the process of warm-up running, step S402 is followed by steps S408 and S409 in which the amounts of increase in the fuel supply to the engine 28 are determined according to a data map stored in the ROM 61, as illustrated in FIG. 15. The engine warm-up increase in the fuel amount determined in step S408 is to increase the richness of the air-fuel mixture since the atomization of the mixture is relatively difficult during the warm-up operation. The engine start-up increase in the fuel amount determined in step S409 is to increase the fuel amount immediately after the engine start-up, in order to assure good combustion of the air-fuel mixture and avoid the engine stall. The determined amounts are stored in the RAM 62.

Steps S406–S409 are followed by step S410 to determine whether the vehicle driver requires an increase in the engine power or not. This determination is made based on the engine speed NE and other parameters. If an affirmative decision (YES) is obtained in step S410, step S411 is executed to determine the amount of increase in the engine output, according to a data map stored in the ROM 61. The determined amount is stored in the RAM 62. If a negative decision (NO) is obtained in step S410, the routine of FIG. 13 is terminated.

Figure 16:
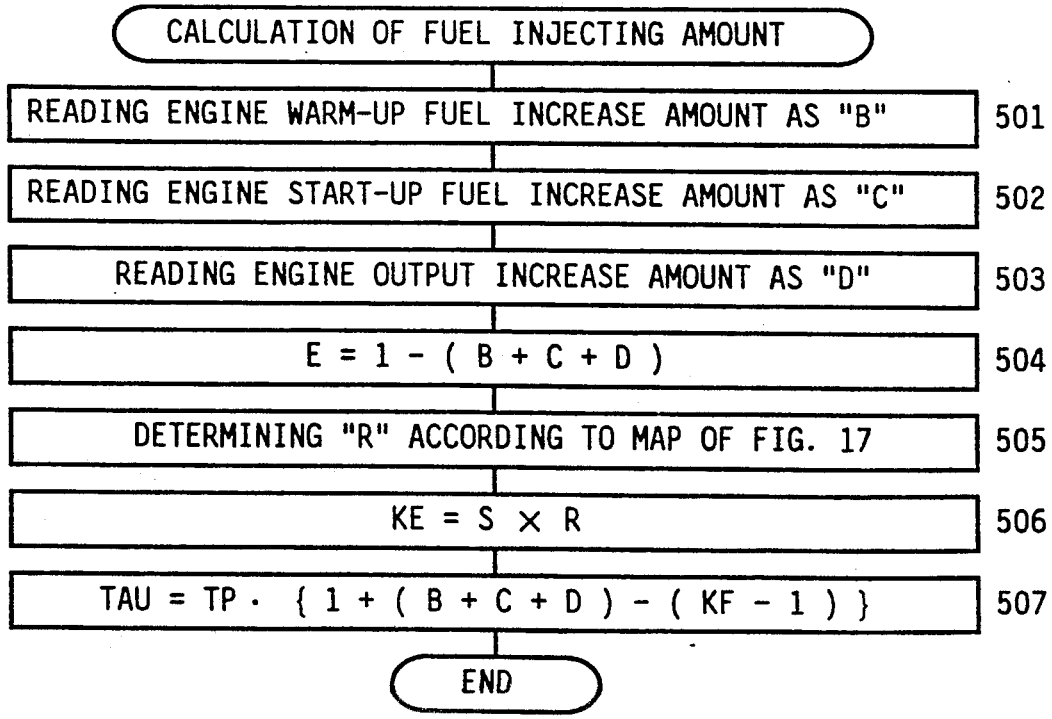
FIG. 16 is a flow chart illustrating a further sub-routine in the main routine of FIG. 11, for calculating fuel injection amount.

The calculation of the fuel injection amount in step S500 in FIG. 11 is effected in a routine as shown in FIG. 16. Initially, steps S501, S502 and S503 are executed to read in from the RAM 62 the amounts determined in steps S410, S411 and S413 as the variables "B", "C" and "D", respectively. Then, step S504 is implemented to calculate a value "E", by subtracting the sum (B+C+D) from "1". This value "E" represents the excess air ratio, i.e., the ratio of the actual amount of air supply to the engine 28 with respect to the stoichiometric air supply amount.

Figure 17:
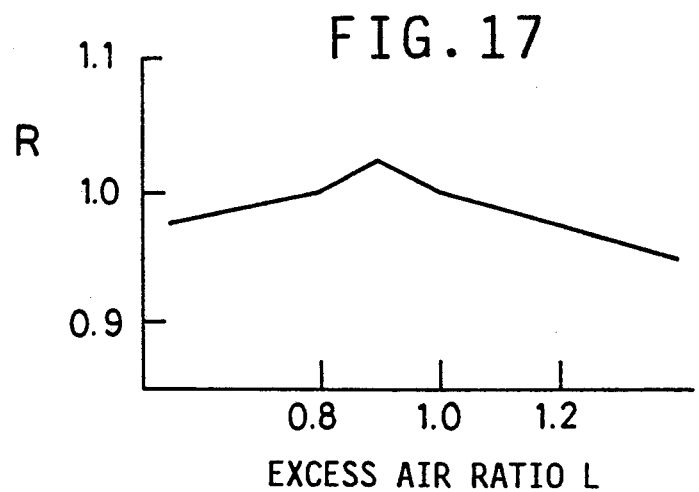
FIG. 17 is a graph showing a data map representative of a compensating value R used in the sub-routine of FIG. 16.

Then, the control flow goes to step S505 to calculate a compensation value "R", according to a data map stored in the ROM 61, which represents a relationship between the excess air ratio "E" and the compensating value "R", as shown in the graph of FIG. 17. It is noted that the engine torque will linearly change when the air/fuel ratio is in the lean-burn range, but will not linearly change when the air/fuel ratio is in the rich-burn range. The compensation value "R" determined by the excess air ratio "E" is to permit the engine torque to linearly change even when the air/fuel ratio is in the rich-burn range. The compensating value "R" has a peak when the excess air ratio "E" is about 0.95, as shown in FIG. 17.

Then, step S506 is executed to read in a compensating value "S" determined in step S702 in an initial routine of FIG. 18, which will be described. This compensating value "S" is multiplied by the compensating value "R", to calculate the variable KE used in step S303 of FIG. 12 to obtain the compensated intake air quantity TQN. In this respect, it is noted that with the same throttle opening TA, the engine torque increases, due to the engine warm-up and start-up fuel increase amounts "B" and "C" during the cold or warm-up operation of the engine 28, while the engine torque decreases due to a friction in the engine 28. With this frictional decrease of the engine torque taken into account, the compensating value "S" is used to determine the variable KE. Even though the value "S" is used so as to reduce the variable KE by the amount corresponding to the frictional decrease of the engine torque, the engine torque will increase due to the fuel increase amounts "B" and "C". Accordingly, the transmission 20 may have a shifting shock if the estimated intake air quantity QNFWD is used rather than the compensated intake air quantity TQN obtained in step S303 is used for shifting the transmission.

Figure 18:
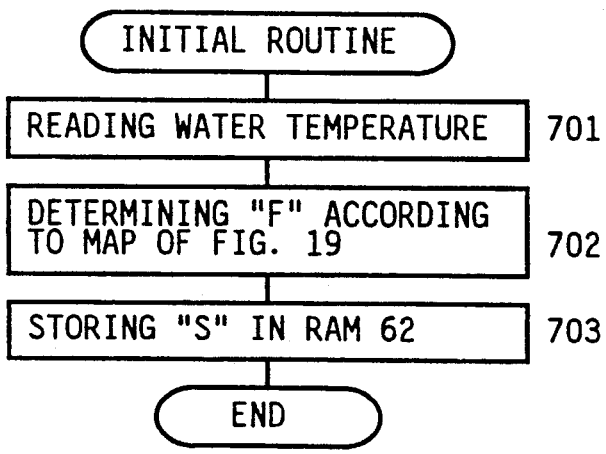
FIG. 18 is a flow chart illustrating an initial routine for calculating a compensating value S used in the sub-routine of FIG. 16.
Figure 19:
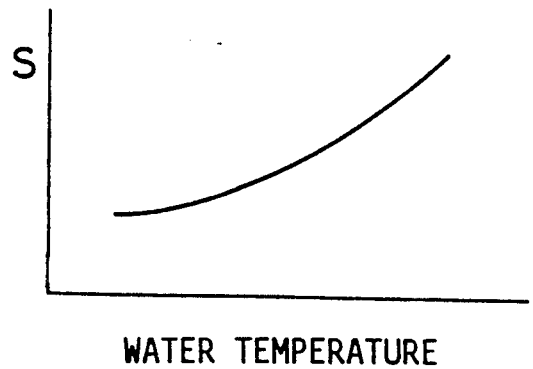
FIG. 19 is a graph showing a data map representative of the compensating value S calculated in the initial routine of FIG. 18.

The initial routine for calculating the compensating value "S" is executed as illustrated in FIG. 18. This routine starts with step S701 in which the water temperature is read. Then, step S702 is executed to calculate the compensating value "S" depending on the water temperature, according to a stored data map as shown in FIG. 19. The compensating value "S" ($\leq 1.0$) increases with an increase in the water temperature, and is eventually set to "1.0" when the water temperature rises to a given level. In the next step S703, the calculated value "S" is stored in the RAM 62.

Step S506 of FIG. 16 is followed by step S507 to calculate the fuel injecting time TAU according to the following equation (7):

$$TAU = TP \times (1 + (B + C + D) - (KF - 1)) \quad (7)$$

In the above equation (7), "TP" represents a basic fuel injecting time determined by the ratio (NE/QNFWD) of the engine speed NE to the estimated intake air quantity QNFWD, and "KF" represents the degree of leanness of the air-fuel mixture as mentioned above. In the present embodiment, the fuel injecting time TAU is proportional to a difference obtained by subtracting (KF−1) which represents the leanness of the air-fuel mixture with respect to the stoichiometric level, from the sum (1+B+C+D) which represents the factors for increasing the engine torque, as described above with respect to steps S408, S409, S410 and S411.

In the present embodiment, an interruption routine of FIG. 20 is executed during interruption of the main routine of FIG. 11, so that the compensated intake air quantity TQN obtained by the engine control computer 53 is used by the transmission control computer 54 for determining the shift control pattern for controlling the transmission 20. In the interruption routine, step S801 is initially executed to determine whether the main routine of FIG. 11 should be interrupted or not. This determination is effected depending upon the value of a suitable interruption flag. If a negative decision (NO) is obtained in step S801, the following steps will not be executed. If an affirmative decision (YES) is obtained in step S801, step S802 is executed to read in from the RAM 62 the compensated intake air quantity TQN which was obtained in step S303.

The compensated intake air quantity TQN is obtained by dividing the estimated intake air quantity QNFWD by the absolute value of the difference between the variables KF and KE. As described above, the variable KF is obtained in step S406 or S407 of FIG. 13, while the variable KE is obtained in step S506 of FIG. 16. When the air/fuel ratio is in the lean-burn range, the variable KF is larger than 1.0, and the compensated intake air quantity TQN is smaller than the estimated intake air quantity QNFWD.

Step S802 is followed by step S803 in which the engine control computer 53 sends the compensated intake air quantity TQN to the transmission control computer 54, which stores this quantity TQN and uses the same in place of the estimated intake air quantity QNFWD, for controlling the transmission.

In the present modified embodiment of FIGS. 11–20, the compensated intake air quantity TQN is read in step S201 in the routine of FIGS. 6 and 7. In the other aspects, the routine for determining the transmission shift boundary lines is the same as illustrated in FIGS. 6 and 7.

Thus, when the air/fuel ratio is in the lean-burn range, the compensated intake air quantity TQN which is smaller than the estimated intake air quantity QNFWD is used as the intake air quantity QN per revolution of the engine 28, for controlling the transmission. This arrangement is effective to assure optimum shifting of the transmission 20 when the engine 28 is a lean-burn engine whose output is relatively low. When the engine 28 is running at a relatively low operating temperature, the variable KE indicative of the richness of the air-fuel mixture is obtained by multiplying the compensating value "R" by the compensating value "S" which is smaller than 1.0. Since the variable KF indicative of the leanness of the mixture is 1.0, the absolute value of the difference between the two variables KF and KE, |KF−KE| is smaller than 1.0, whereby the quantity TQN is larger than the quantity QNFWD. While the engine output with a given throttle opening is made larger during a cold or warm-up operation of the engine 28 than during a normal operation at a sufficiently high temperature, the transmission does not suffer from a shifting shock even during the cold or warm-up operation of the engine, because the shift control pattern for the transmission is determined based on the compensated intake air quantity TQN which is larger than QNFWD during the cold or warm-up operation.

While the present invention has been described above its presently preferred embodiments, it is to be understood that the invention is not limited to the details of the illustrated embodiments, but may be embodied with various changes, modifications and improvements, which may occur to those skilled in the art.

For instance, where the intake air quantity is expressed as a volume per revolution of the engine, the intake air quantity may be compensated for a variation in the density of the intake air, i.e., a variation in the atmospheric pressure. This modification permits consistent shock-free shifting of the transmission at a constant torque value, irrespective of the altitude of the vehicle. Further, the estimated intake air quantity QNFWD used in the first embodiment or the compensated intake air quantity TQN in the second embodiment may be converted into a basic fuel injecting time TP, which is used for controlling shifting actions of the transmission.

What is claimed is:

1. A shift control apparatus for an automatic transmission of a motor vehicle having an internal combustion engine, comprising:

throttle opening sensing means for detecting an opening of a throttle valve which regulates an intake air quantity supplied to the engine;

engine speed sensing means for detecting a speed of the engine;

vehicle speed sensing means for detecting a running speed of the vehicle;

calculating means for calculating said intake air quantity for a steady running of the vehicle, based on the detected opening of said throttle valve and the detected speed of the engine;

processing means for processing the calculated intake air quantity to compensate said calculated intake air quantity for a first-order time lag and obtain an estimated intake air quantity; and automatic shift control means for automatically selecting an optimum operating position of the automatic transmission, based on said estimated intake air quantity and the detected running speed of the vehicle, according to a predetermined shift control pattern.

2. A shift control apparatus according to claim 1, wherein said calculating means includes a memory which stores a data map representative of a relationship among said calculated intake air quantity (QNTA) for steady running of the vehicle, said opening (TA) of the throttle valve and said speed (NE) of the engine.

3. A shift control apparatus according to claim 1, wherein said processing means includes means (S103) for determining a time constant variable (TIMCA) on the basis of said speed (NE) of the engine and said calculated intake air quantity (QNTA) for steady running of the vehicle, and means (S104) for changing said calculated intake air quantity (QNTA) for steady running of the vehicle, on the basis of said time constant variable, to obtain said estimated intake air quantity (QNFWD), said time constant variable being indicative of a time constant for the first-order time lag.

4. A shift control apparatus according to claim 3, wherein said processing means includes means (S109) for obtaining a smoothed value (tA) on the basis of said calculated intake air quantity (QNTA) for steady running of the vehicle and said time constant variable, and means (S110) for obtaining said estimated intake air quantity (QNFWD) on the basis of said smoothed value.

5. A shift control apparatus according to claim 4, wherein said processing means includes means (S108) for calculating a time period (T) between a moment when said intake air quantity (QNTA) for steady running of the vehicle is calculated, and a moment when an intake valve of said engine is closed, said means (S109) for obtaining a smoothed value (tA) obtaining said smoothed value upon expiration of said time period.

6. A shift control apparatus according to claim 1, wherein said processing means includes means for detecting an intake air amount (QN) upstream of said throttle valve, and means (S107) for changing said calculated intake air quantity (QNTA) for steady running of the vehicle, on the basis of said intake air mount upstream of said throttle valve, to obtain said estimated intake air quantity (QNFWD).

7. A shift control apparatus according to claim 6, wherein said processing means further includes means (S106) for determining a time constant variable (TIMC) on the basis of said speed (NE) of the engine, means (S107) for obtaining a smoothed value (QNSM) on the basis of said intake air amount (QN) upstream of said throttle valve and said time constant variable (TIMC), and means (S110) for obtaining said estimated intake air quantity (QNFWD) on the basis of said smoothed value.

8. A shift control apparatus according to claim 1, wherein said automatic shift control means includes means (S207) for determining a first shift-down boundary line (QNSPD), on the basis of said estimated intake air quantity (QNFWD) and said running speed of the vehicle, for shifting down said automatic transmission from a currently selected position.

9. A shift control apparatus according to claim 8, wherein said automatic shift control means includes means (S209) for determining whether said opening (TA) of said throttle valve is larger than a predetermined level or not, and means (S212) for using said first shift-down boundary line (QNSPD) as an effective shift-down boundary line if said opening of the throttle valve is lower than said predetermined level.

10. A shift control apparatus according to claim 9, wherein said automatic shift control means further includes means (S210) for determining a second shift-down boundary line (TASPD), on the basis of said opening (TA) of the throttle valve and said running speed of the vehicle, if said opening of the throttle valve is not lower than said predetermined level, and means (S210) for selecting as said effective shift-down boundary line one of said first and second shift-down boundary lines (QNSPD, TASPD) which permits said transmission to be shifted down at a higher running speed of the vehicle at a given amount of said opening of the throttle valve.

11. A shift control apparatus according to claim 1, wherein said processing means includes means (S301-S303, S401-S411, S501-S506, S701-S703) for obtaining a compensated intake air quantity (TQN) on the basis of said estimated intake air quantity (QNFWD), and said automatic shift control means selects said optimum operating position of the automatic transmission, based on said compensated intake air quantity.

12. A shift control apparatus according to claim 11, wherein said means for obtaining a compensated intake air quantity includes means (S403-S407) for determining a first variable (KF) representative of a degree of leanness of an air-fuel mixture supplied to said engine, and means (S303) for obtaining said compensated intake air quantity (TQN) on the basis of said first variable as well as said estimated intake air quantity (QNFWD).

13. A shift control apparatus according to claim 12, wherein said means for obtaining a compensated intake air quantity further includes means (S501-S506) for determining a second variable (KE) representative of a degree of richness of said air-fuel mixture, and means (S303) for obtaining said compensated intake air quantity (TQN) on the basis of said second variable (KE) as well as said estimated intake air quantity (QNFWD) and said first variable (KF).

14. A shift control apparatus according to claim 12, wherein said means (S403-S407) for determining a first variable (KF) determines said first variable on the basis of said estimated intake air quantity (QNFWD) and said speed (NE) of the engine.

15. A shift control apparatus according to claim 13, wherein said means (S501–S506) for determining a second variable (KE) determines said second variable on the basis of an excess air ratio of said air-fuel mixture.

16. A shift control apparatus according to claim 15, wherein said means (S501–S506) for determining a second variable (KE) determines said second variable on the basis of a temperature of said engine as well as said excess air ratio.

17. A shift control apparatus according to claim 13, wherein said means (S301–S303, S401–S411, S501–S506, S701–S703) for obtaining a compensated intake air quantity (TQN) obtains said compensated intake air quantity by dividing said estimated intake air quantity (QNFWD) by an absolute value of a difference between said first and second variables (KF, KE).

* * * * *